United States Patent
Lee et al.

(10) Patent No.: US 10,505,277 B2
(45) Date of Patent: Dec. 10, 2019

(54) ELECTRONIC DEVICE HAVING LOOP ANTENNA

(71) Applicant: Samsung Electronics Co., Ltd., Suwon-si, Gyeonggi-do (KR)

(72) Inventors: Woosup Lee, Suwon-si (KR); Jungsik Park, Suwon-si (KR); Gaeun Lee, Suwon-si (KR); Soyoung Lee, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/015,773

(22) Filed: Jun. 22, 2018

(65) Prior Publication Data
US 2019/0006756 A1    Jan. 3, 2019

(30) Foreign Application Priority Data
Jul. 3, 2017 (KR) .................. 10-2017-0084249

(51) Int. Cl.
*H01Q 7/00* (2006.01)
*H01Q 1/52* (2006.01)
(Continued)

(52) U.S. Cl.
CPC ............. *H01Q 7/00* (2013.01); *H01Q 1/2216* (2013.01); *H01Q 1/526* (2013.01); *H01Q 21/30* (2013.01);
(Continued)

(58) Field of Classification Search
CPC .. H01Q 7/00; H01Q 1/22; H01Q 1/52; H01Q 21/30; H01Q 1/24; H04M 1/02
(Continued)

(56) References Cited

U.S. PATENT DOCUMENTS

2017/0017938 A1   1/2017  Lee et al.
2017/0033610 A1*  2/2017  Borin .................... H01F 27/365
2017/0179773 A1*  6/2017  Kim ..................... H01F 27/2804

FOREIGN PATENT DOCUMENTS

EP       3 048 565 A2    7/2016
KR    10-2014-0143009 A  12/2014
(Continued)

OTHER PUBLICATIONS

International Search Report dated Oct. 12, 2018; Application #: PCT/KR2018/007109.

*Primary Examiner* — Andrea Lindgren Baltzell
(74) *Attorney, Agent, or Firm* — Jefferson IP Law, LLP

(57) ABSTRACT

An electronic device is provided The electronic device includes a housing including a first surface facing a first direction, a second surface facing a second direction opposite to the first direction, and a side member configured to enclose at least some of a space between the first surface and the second surface, a first conductive coil positioned inside the housing and configured to form a first magnetic field in a direction substantially perpendicular to the first direction or the second direction, a second conductive coil spaced apart from the first conductive coil within the housing and configured to form a second magnetic field in a direction substantially parallel to the first direction or the second direction, a communication circuit positioned inside the housing and electrically connected to the first and second conductive coils, and a processor positioned inside the housing and electrically connected to the communication circuit.

20 Claims, 29 Drawing Sheets

(51) Int. Cl.
  *H01Q 1/22* (2006.01)
  *H01Q 21/30* (2006.01)
  *H04M 1/02* (2006.01)
  *H01Q 1/24* (2006.01)
(52) U.S. Cl.
  CPC ............ *H04M 1/026* (2013.01); *H01Q 1/243* (2013.01); *H04M 1/0264* (2013.01); *H04M 1/0277* (2013.01); *H04M 2250/04* (2013.01)
(58) Field of Classification Search
  USPC ........................................................ 343/842
  See application file for complete search history.

(56) References Cited

FOREIGN PATENT DOCUMENTS

| KR | 10-2017-0008657 A | 1/2017 |
| KR | 10-2017-0072712 A | 6/2017 |
| KR | 10-2017-0072839 A | 6/2017 |

* cited by examiner

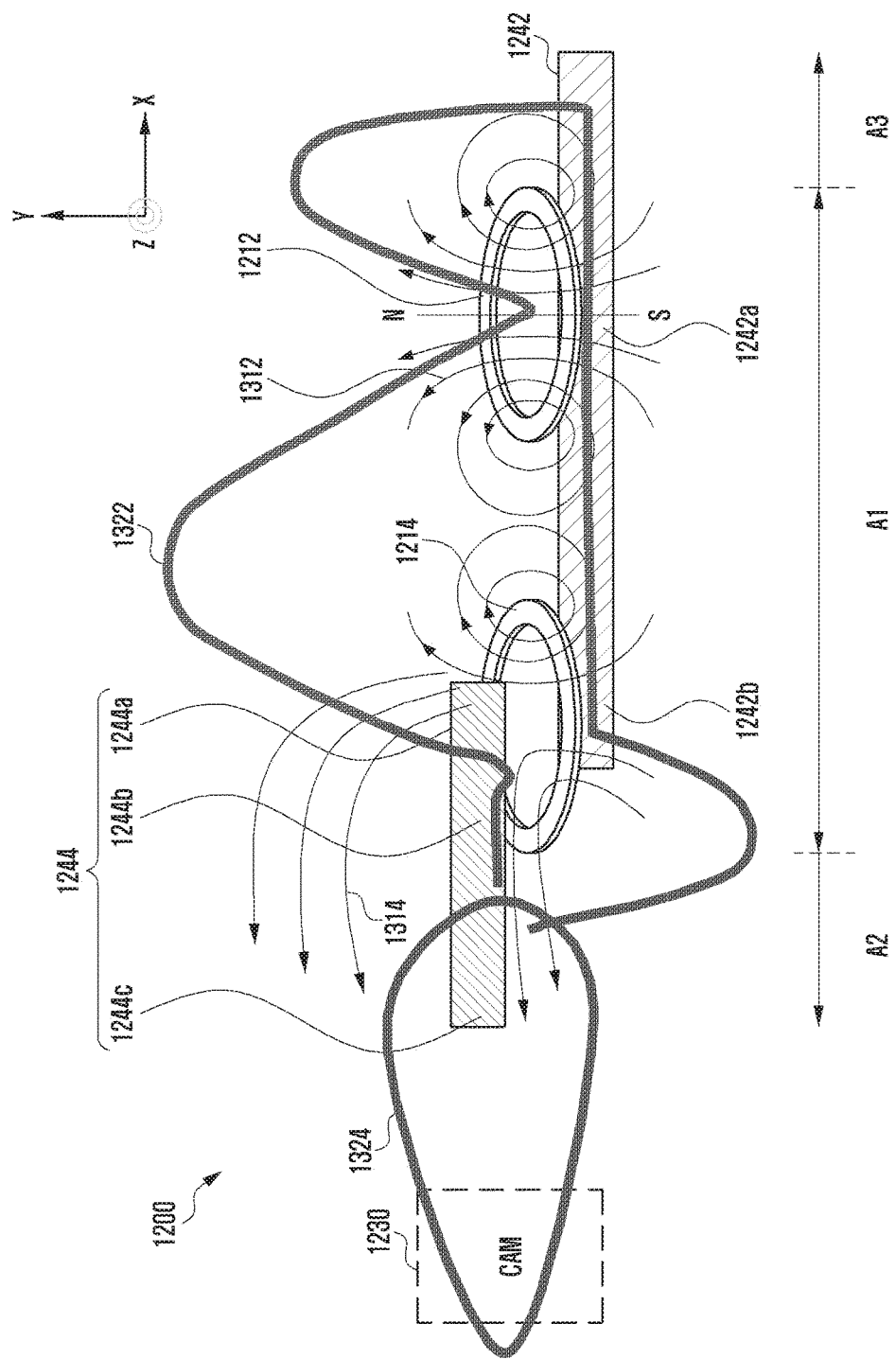

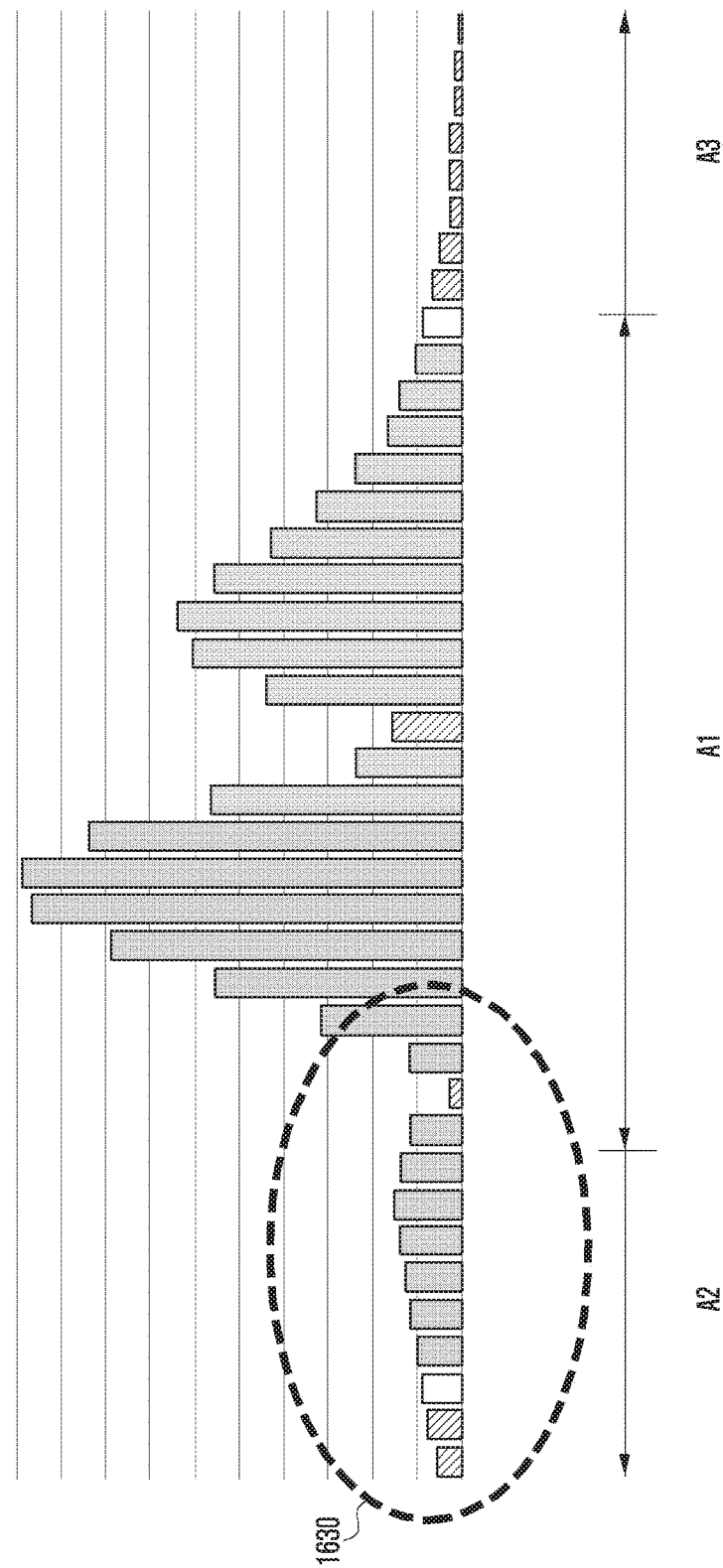

| Z↓X→ | -8 | -7 | -6 | -5 | -4 | -3 | -2 | -1 | 0 | 1 | 2 | 3 | 4 | 5 | 6 | 7 | 8 |
|---|---|---|---|---|---|---|---|---|---|---|---|---|---|---|---|---|---|
| 5 | X | X | X | X | X | X | X | X | O | O | O | O | O | X | X | X | X |
| 4 | X | X | X | O | O | O | X | X | O | O | O | O | O | O | X | X | X |
| 3 | X | X | O | O | O | O | O | O | O | O | O | O | O | O | O | X | X |
| 2 | X | X | O | O | O | O | O | O | O | O | O | O | O | X | O | O | O |
| 1 | X | X | O | O | O | O | O | O | O | O | O | O | O | O | O | O | O |
| 0.5 | X | X | O | O | O | O | O | O | O | O | O | O | O | O | O | O | O |

| Y-Z Plane | SCORE |
|---|---|
| Section 1 (WEIGHTx3) | 93 |
| Section 2 (WEIGHTx2) | 50 |
| Section 3 (WEIGHTx1) | 12 |
| Total | 155 |

| X-Y Plane | |
|---|---|
| Total | 97 |
| RECOGNITION RATE | 63.40 |

| Y↓X→ | 8 | 7 | 6 | 5 | 4 | 3 | 2 | 1 | 0 | -1 | -2 | -3 | -4 | RECOGNITION NUMBER |
|---|---|---|---|---|---|---|---|---|---|---|---|---|---|---|
| 8 | X | X | O | O | X | X | X | X | X | X | X | X | X | 4 |
| 7 | X | X | O | O | X | X | O | O | O | O | O | X | X | 5 |
| 6 | X | X | O | O | X | X | X | O | O | O | O | X | X | 4 |
| 5 | X | X | X | X | X | X | X | X | X | X | X | X | X | 0 |
| 4 | O | O | O | O | O | O | O | O | O | O | O | O | O | 8 |
| 3 | O | O | O | O | O | O | O | O | O | O | O | O | O | 9 |
| 2 | O | O | O | O | O | O | O | O | O | O | O | O | O | 9 |
| 1 | O | O | O | O | O | O | O | O | O | O | O | O | O | 9 |
| 0 | X | X | X | X | X | X | X | X | X | X | X | X | X | 0 |
| -1 | O | O | O | O | O | O | O | O | O | O | O | X | X | 6 |
| -2 | O | O | O | O | O | O | O | O | O | O | O | X | X | 6 |
| -3 | O | O | O | O | O | O | O | O | O | O | O | X | X | 6 |
| -4 | O | O | O | O | O | O | O | O | O | O | O | X | X | 6 |
| -5 | O | O | O | O | O | O | O | X | X | X | X | X | X | 6 |
| -6 | O | O | O | O | X | X | X | X | X | X | X | X | X | 4 |
| -7 | X | X | X | X | X | X | X | X | X | X | X | X | X | 0 |
| -8 | X | X | X | X | X | X | X | X | X | X | X | X | X | 0 |

ELECTRONIC DEVICE HAVING LOOP ANTENNA

CROSS-REFERENCE TO RELATED APPLICATION(S)

This application is based on and claims priority under 35 U.S.C. § 119(a) to Korean patent application number 10-2017-0084249, filed on Jul. 3, 2017, in the Korean Intellectual Property Office, the disclosure of which is incorporated by reference herein in its entirety.

BACKGROUND

1. Field

The disclosure relates to an electronic device having a loop antenna. More particularly, the electronic device may transmit a magnetic field signal including payment information using a loop antenna.

2. Description of the Related Art

In general, a card reading device (i.e., points of sales (POS) terminal) has a header and a coil for reading information about a track of a magnetic card. The track is card data recorded in a magnetic strip line (e.g., a black line having a magnetic property) of the magnetic card and has a start sentinel (SS), end sentinel (ES), and longitudinal redundancy check character (LRC).

When the track is swiped at a position of a header of a rail portion of the card reading device, a magnetic flux passing through the coil connected to the header is changed. A current corresponding to a change of the magnetic flux is generated in the card reading device, and the card reading device may read and process card data recorded in the track from such as current.

The electronic device may have a module for performing magnetic field communication with the card reading device. The electronic device may transmit a magnetic field signal to the card reading device through such a module to transmit data with a method similar to a method of swiping a magnetic card.

The electronic device may include an antenna for magnetic field communication. However, as a size of the electronic device reduces and functions provided by the electronic device increase, in the electronic device, a space for mounting the antenna may reduce. Further, there is a problem that should receive various types of antennas within a limited space of the electronic device. Further, because various components of the electronic device are made of a conductive material such as a metal, a transmission and reception performance of the antenna may be deteriorated by such components.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

The disclosure has been made in view of the above problems and provides an electronic device that can improve a radiation performance thereof.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first surface facing a first direction, a second surface facing a second direction opposite to the first direction, and a side member configured to enclose at least some of a space between the first surface and the second surface, a first conductive coil positioned inside the housing and configured to form a first magnetic field in a direction substantially perpendicular to the first direction or the second direction, a second conductive coil spaced apart from the first conductive coil within the housing and configured to form a second magnetic field in a direction substantially parallel to the first direction or the second direction, a communication circuit positioned inside the housing and electrically connected to the first and second conductive coils, and a processor positioned inside the housing and electrically connected to the communication circuit.

In accordance with another aspect of the disclosure, an electronic device is provided. The electronic device includes a housing including a first surface facing a first direction, a second surface facing a second direction opposite to the first direction, and a side member configured to enclose at least some of a space between the first surface and the second surface, a component positioned inside the housing adjacent to one side of the second surface, a first conductive coil positioned inside the housing and configured to form a first magnetic field in a direction substantially perpendicular to the first direction or the second direction, a second conductive coil positioned inside the housing between the component and the first conductive coil when viewed from above the second surface and configured to form a second magnetic field in a direction substantially parallel to the first direction or the second direction, a communication circuit positioned inside the housing and electrically connected to the first and second conductive coils, and a processor positioned inside the housing and electrically connected to the communication circuit.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 13A and 13B are diagrams illustrating a magnetic field generated in an MST module having two loop antennas according to an embodiment of the disclosure;

FIGS. 16A and 16B are diagrams illustrating a magnetic field generated in an MST module having two loop antennas according to an embodiment of the disclosure;

FIG. 18 is a table illustrating scores of test results of radiation efficiency based on an antenna structure of an electronic device according to an embodiment of the disclosure; and FIG. 19 is a table illustrating scores of test results of radiation efficiency based on an antenna structure of an electronic device according to an embodiment of the disclosure.

DETAILED DESCRIPTION OF EMBODIMENTS

Figure 1:
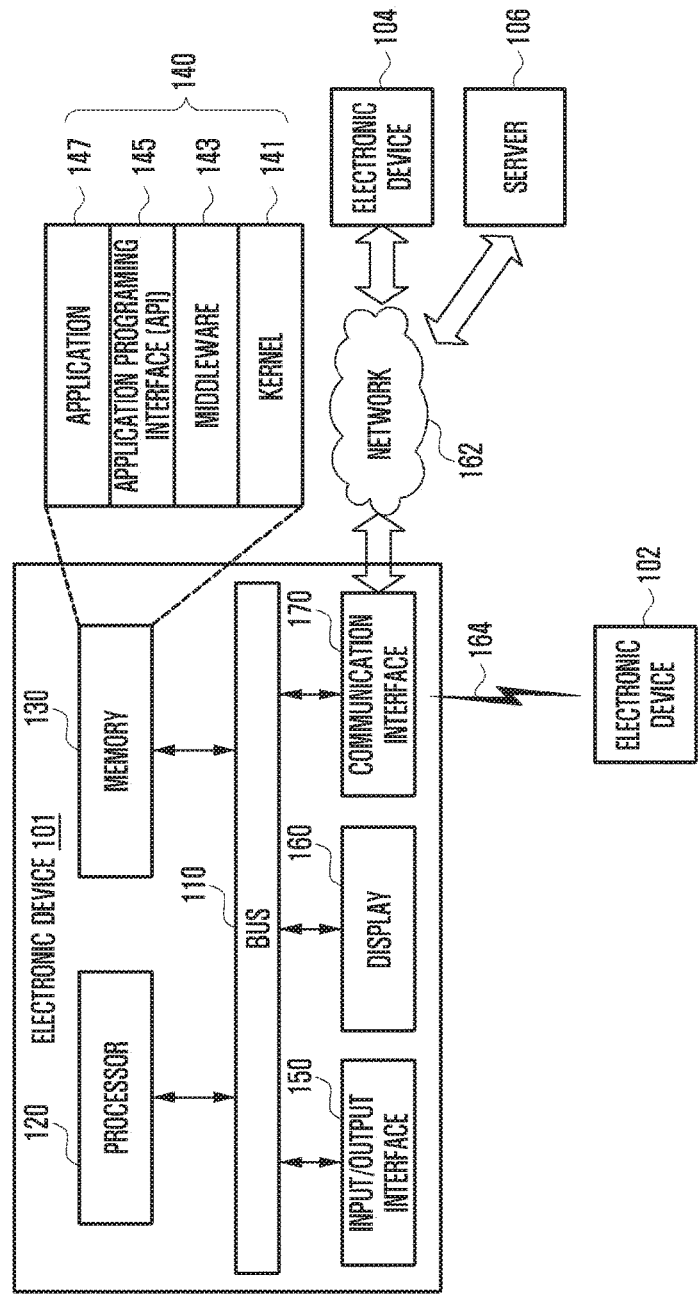
FIG. 1 is a block diagram illustrating a configuration of an electronic device in a network environment according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the dictionary meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the disclosure, the expression "and/or" includes any and all combinations of the associated listed words. For example, the expression "A and/or B" may include A, may include B, or may include both A and B.

In the disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the disclosure.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween. The terms used in the disclosure are only used to describe specific various embodiments, and are not intended to limit the disclosure. As used herein, the singular forms are intended to include the plural forms as well, unless the context clearly indicates otherwise. Singular forms are intended to include plural forms unless the context clearly indicates otherwise.

An electronic device according to the disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a Television (TV), a digital versatile disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (for example, Samsung HomeSync™, Apple TV™, or Google TV™), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the disclosure is not limited to the aforementioned devices.

FIG. 1 is a block diagram illustrating a configuration of an electronic device according to an embodiment of the disclosure.

Referring to FIG. 1, an electronic device 101 may include a bus 110, a processor 120, a memory 130, an input/output interface 150, a display 160 and a communication interface 170, and other similar and/or suitable components.

The bus 110 may be a circuit which interconnects the above-described elements and delivers a communication (e.g., a control message) between the above-described elements.

The processor 120 may receive commands from the above-described other elements (e.g., the memory 130, the input/output interface 150, the display 160, the communication interface 170, etc.) through the bus 110, may interpret the received commands, and may execute calculation or data processing according to the interpreted commands. The processor 120 may include a microprocessor or any suitable type of processing circuitry, such as one or more general-purpose processors (e.g., advanced reduced instruction set computer (RISC) machines (ARM)-based processors), a digital signal processor (DSP), a programmable logic device (PLD), an application-specific integrated circuit (ASIC), a field-programmable gate array (FPGA), a graphical processing unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and operations provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure.

The memory 130 may store commands or data received from the processor 120 or other elements (e.g., the input/output interface 150, the display 160 and the communication interface 170, etc.) or generated by the processor 120 or the other elements. The memory 130 may include programming modules 140, such as a kernel 141, middleware 143, an application programming interface (API) 145, an application 147, and the like. Each of the above-described programming modules 140 may be implemented in software, firmware, hardware, or a combination of two or more thereof.

The kernel 141 may control or manage system resources (e.g., the bus 110, the processor 120, the memory 130, and/or other hardware and software resources) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications.

The API 145 is an interface through which the application 147 is capable of controlling a function provided by the kernel 141 or the middleware 143, and may include, for example, at least one interface or function for file control, window control, image processing, character control, or the like.

The input/output interface 150, for example, may receive a command or data as input from a user, and may deliver the received command or data to the processor 120 or the memory 130 through the bus 110. The display 160 may display a video, an image, data, or the like to the user.

The communication interface 170 may connect communication between one of external electronic devices 102 and 104 and the electronic device 101. The communication interface 170 may support a predetermined short-range communication protocol 164 (e.g., Wi-Fi, bluetooth (BT), and near field communication (NFC)), or predetermined network 162 (e.g., the Internet, a local area network (LAN), a wide area network (WAN), a telecommunication network, a cellular network, a satellite network, a plain old telephone service (POTS), or the like). Each of the external electronic devices 102 and 104 may be a device which is identical (e.g., of an identical type) to or different (e.g., of a different type) from the electronic device 101. Further, the communication interface 170 may connect communication between a server 106 and the electronic device 101 via the network 162.

Figure 2:
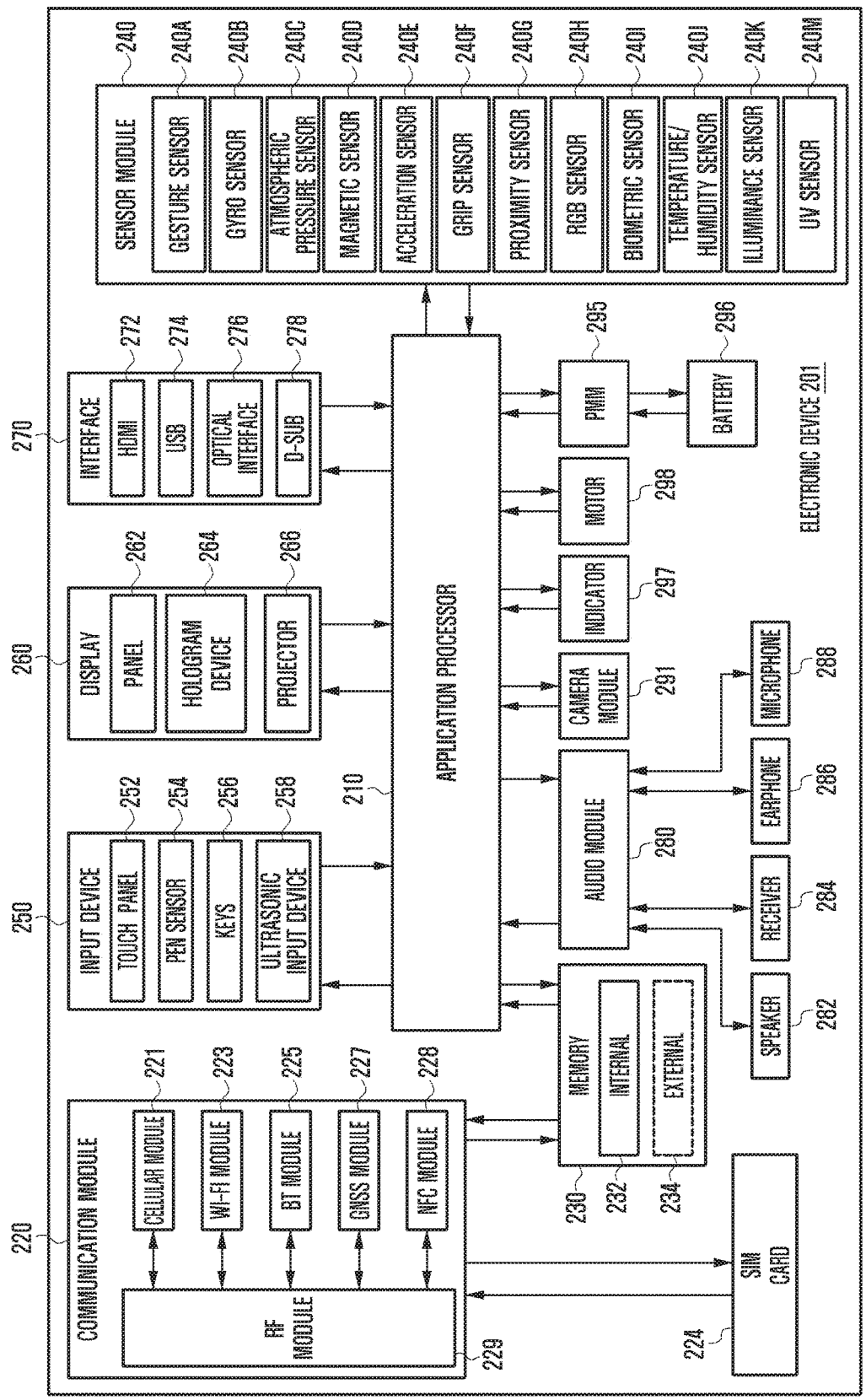
FIG. 2 is a block diagram illustrating a configuration of an electronic device according to various embodiments of the disclosure.

FIG. 2 is a block diagram illustrating a configuration of an electronic device 201 according to an embodiment of the disclosure.

The hardware shown in FIG. 2 may be, for example, the electronic device 101 illustrated in FIG. 1.

Referring to FIG. 2, the electronic device may include one or more application processors (APs) (hereinafter AP) 210, a communication module 220, a subscriber identification module (SIM) card 224, a memory 230, a sensor module 240, an input device 250, a display 260, an interface 270, an audio module 280, a camera module 291, a power management module (PMM) 295, a battery 296, an indicator 297, a motor 298 and any other similar and/or suitable components.

The AP 210 (e.g., the processor 120) may include one or more APs, or one or more communication processors (CPs). The AP 210 may be, for example, the processor 120 illustrated in FIG. 1. The AP 210 is illustrated as being included in the AP 210 in FIG. 2, but may be included in different integrated circuit (IC) packages, respectively. According to an embodiment of the disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the disclosure, the AP 210 may further include a GPU (not illustrated).

The AP 210 may manage a data line and may convert a communication protocol in the case of communication between the electronic device (e.g., the electronic device 101) including the hardware and different electronic devices connected to the electronic device through the network. The AP 210 may be implemented by, for example, an SoC. According to an embodiment of the disclosure, the AP 210 may perform at least some of multimedia control functions. The AP 210, for example, may distinguish and authenticate a terminal in a communication network by using a subscriber identification module (e.g., SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the disclosure, the AP 210 may include at least some (e.g., the CP) of the above-described elements.

According to an embodiment of the disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 101. The SIM card 224 may include unique identification information (e.g., integrated circuit card IDentifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a onetime programmable ROM (OTPROM), a programmable ROM (PROM), an erasable and programmable ROM (EPROM), an electrically erasable and programmable ROM (EEPROM), a mask ROM, a flash ROM, a Not AND (NAND) flash memory, a not OR (NOR) flash memory, etc.). According to an embodiment of the disclosure, the internal memory 232 may be in the form of a solid state drive (SSD). The external memory 234 may further include a flash drive, for example, a compact flash (CF), a secure digital (SD), a micro-secure digital (Micro-SD), a mini-secure digital (Mini-SD), an extreme Digital (xD), a memory stick, or the like.

The communication module 220 may include a cellular module 221, a Wi-Fi module 223 or a radio frequency (RF) module 229. The communication module 220 may be, for example, the communication interface 170 illustrated in FIG. 1. The communication module 220 may include, for example, a Wi-Fi module 223, a BT module 225, a global navigation satellite system (GNSS) module 227, or an NFC module 228. For example, the Wi-Fi module 223 may provide a Wi-Fi communication function by using a RF. Additionally or alternatively, the Wi-Fi module 223 may include a network interface (e.g., a LAN card), a modulator/demodulator (modem), or the like for connecting the hardware to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF module 229 may include, for example, a transceiver, a power amplifier module (PAM), a frequency filter, a low noise amplifier (LNA), or the like. Also, the RF module 229 may further include a component for transmitting and receiving electromagnetic waves in a free space in a Wi-Fi communication, for example, a conductor, a conductive wire, or the like.

A sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and a ultra violet (UV) sensor 240M. The sensor module 240 may measure a physical quantity or may sense an operating state of the electronic device 101, and may convert the measured or sensed information to an electrical signal. Additionally/alternatively, the sensor module 240 may include, for example, an E-nose sensor (not illustrated), an electromyography (EMG) sensor (not illustrated), an electro encephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the input/output interface 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of Wi-Fi recognition. According to an embodiment of the disclosure, the hardware may receive a user input from an external device (e.g., a network, a computer, or a server), which is connected to the communication module 220, through the communication module 220.

The display 260 may include a panel 262, a hologram device 264, or a projector 266. The display 260 may be, for example, the display 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252 and one module. The hologram device 264 may display a three-dimensional image in the air by using interference of light. According to an embodiment of the disclosure, the display 260 may further include a control circuit for controlling the panel 262 or the hologram device 264.

The interface 270 may include, for example, a high-definition multimedia interface (HDMI) 272, a universal Serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio module 280 may bi-directionally convert between a voice and an electrical signal. The audio module 280 may convert voice information, which is input to or output from the audio module 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an image signal processor (ISP) (not illustrated), and a flash LED (not illustrated).

The power management module 295 may manage power of the hardware. Although not illustrated, the power management module 295 may include, for example, a power management integrated circuit (PMIC), a charger IC, or a battery fuel gauge.

The PMIC may be mounted to, for example, an IC or an SoC semiconductor. Charging methods may be classified into a wired charging method and a Wi-Fi charging method. The charger IC may charge a battery, and may prevent an overvoltage or an overcurrent from a charger to the battery. According to an embodiment of the disclosure, the charger IC may include a charger IC for at least one of the wired charging method and the Wi-Fi charging method. Examples of the Wi-Fi charging method may include a magnetic resonance method, a magnetic induction method, an electromagnetic method, and the like. Additional circuits (e.g., a coil loop, a resonance circuit, a rectifier, etc.) for Wi-Fi charging may be added in order to perform the Wi-Fi charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware or a part (e.g., the AP 210) of the hardware, for example, a booting state, a message state, a charging state and the like. The motor 298 may convert an electrical signal into a mechanical vibration. The AP 210 may control the sensor module 240.

Although not illustrated, the hardware may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware according to an embodiment of the disclosure may include one or more components, and the name of the relevant element may change depending on the type of electronic device. The hardware according to an embodiment of the disclosure may include at least one of the above-described elements. Some of the above-described elements may be omitted from the hardware, or the hardware may further include additional elements. Also, some of the elements of the hardware according to an embodiment of the disclosure may be combined into one entity, which may perform functions identical to those of the relevant elements before the combination.

The term "module" used in the disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the disclosure may include at least one of an ASIC chip, a FPGA, and a programmable-logic device for performing certain operations which have been known or are to be developed in the future.

Figure 3:
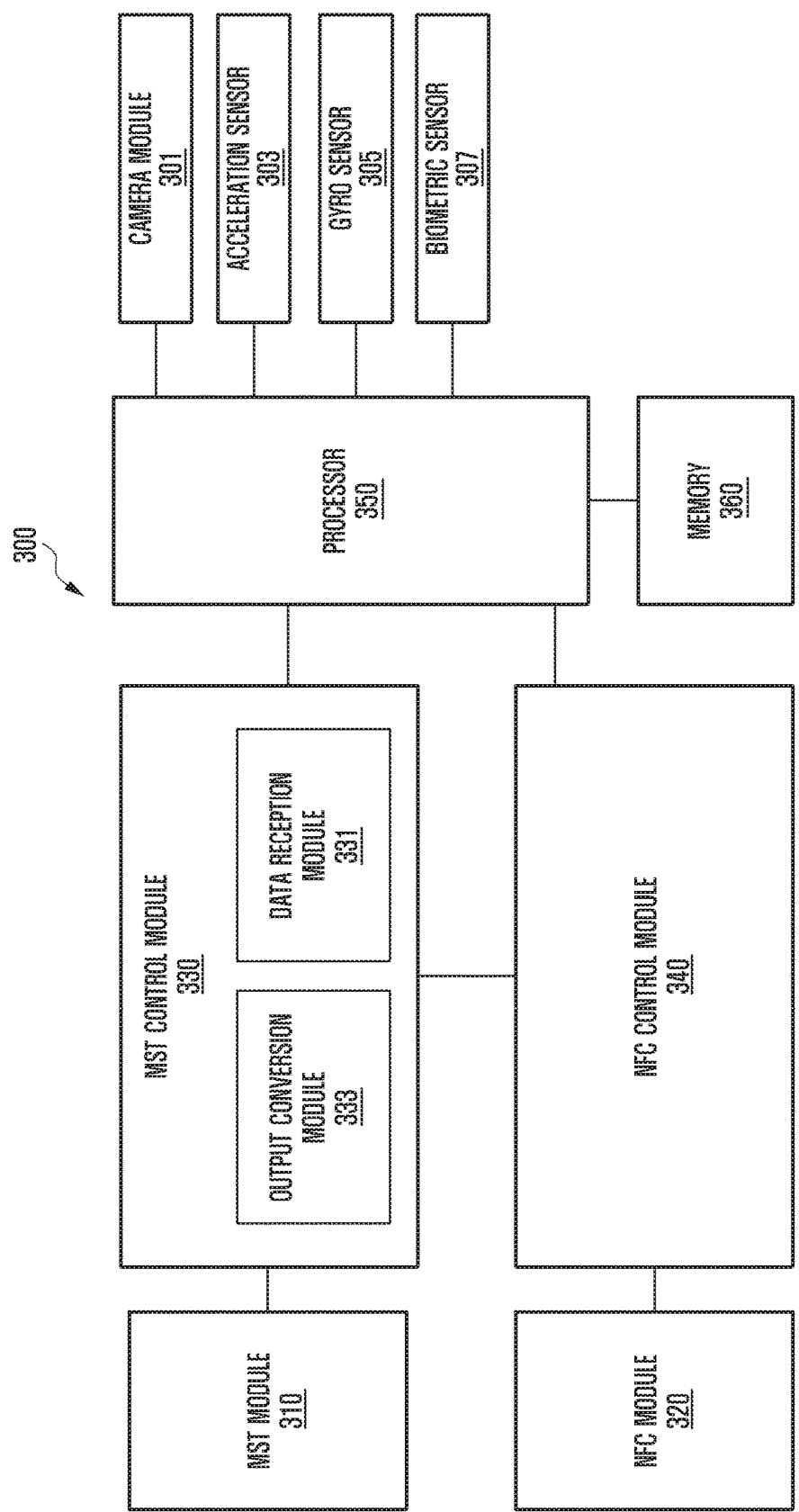
FIG. 3 is a block diagram illustrating a configuration of an electronic device that can perform a payment function according to various embodiments of the disclosure.

FIG. 3 is a block diagram illustrating a configuration of an electronic device that can perform a payment function according to various embodiments of the disclosure.

Referring to FIG. 3, an electronic device 300 (e.g., electronic device 101) according to various embodiments may include a camera module 301 (e.g., camera module 291), acceleration sensor 303 (e.g., acceleration sensor 240E), gyro sensor 305 (e.g., gyro sensor 240B), biometric sensor 307 (e.g., biometric sensor 240I), magnetic secure transmission (MST) module 310, NFC module 320 (e.g., NFC module 228), MST control module 330, NFC control module 340, processor 350 (e.g., processor 120), and memory 360 (e.g., memory 130).

The camera module 301 may photograph, for example, a card necessary for payment to obtain card information. The camera module 301 may recognize card information (card company, card number, card effective date, and card owner) marked in the card through an optical character reader (OCR) function. Alternatively, a user may input necessary card information to the electronic device using an input device (e.g., a touch panel, pen sensor, key, ultrasonic input device, or microphone input device) included in the terminal.

The acceleration sensor 303 or the gyro sensor 305 may obtain, for example, location information of the electronic device upon payment. The obtained location information of the electronic device may be transferred to the processor 350, and the processor 350 may control intensity of a current supplied to an antenna (e.g., a loop antenna) of the MST module 310 based on the obtained position information of the electronic device to control intensity of a magnetic field transmitted to a POS terminal or may select a loop antenna to use when a plurality loop antennas exist.

The biometric sensor 307 may obtain, for example, the user's biometric information (e.g., fingerprint information or iris information) in order to perform user authentication or a card for payment.

The MST module 310 may include, for example, a loop antenna configured with a conductive coil. For example, the MST control module 330 may supply a voltage of different directions to both ends of the loop antenna according to data (e.g., 0 or 4 bits) and control a direction of a current flowing to the loop antenna. A signal (a magnetic field signal by the coil in which a current flows) transmitted through the loop antenna may generate an induced electromotive force in the POS terminal in a form similar to an operation in which a magnetic card is actually read in the POS terminal.

The MST control module 330 may include, for example, a data reception module 331 and an output conversion module 333. According to an embodiment, the data reception module 331 may receive pulses of a logical low/high (low/high) form including payment information transmitted by the processor 350 (or a security module within the electronic device 300). According to an embodiment, in order to transfer data recognized in the data reception module 331 to the MST module 310, the output conversion module 333 may include a circuit that converts the data in a required form. The circuit may include a circuit (h-bridge) that changes a direction of a voltage supplied to both ends of the MST module 310.

The NFC module 320 may include, for example, another loop antenna configured with a conductive coil.

The NFC control module 340 may transmit, for example, card information to an external device (e.g., a card reading device) through the other loop antenna.

According to an embodiment, a loop antenna included in the MST module 310 and another loop antenna included in the NFC module 320 may share at least some of the conductive coil. For example, the MST control module 330 may transmit a signal to an external device using a conductive coil included in the MST module 310 and another conductive coil included in the NFC module 320. According to another embodiment, the NFC control module 340 may transmit a signal to the external device using a conductive coil included in the MST module 310 and another conductive coil included in the NFC module 320. According to an embodiment, the electronic device 300 may receive payment information included in at least some of a magnetic stripe of a card (e.g., a magnetic card) from a card company/bank server through a communication module (e.g., communication module 220) based on the card information input through the camera module 301 or the input device (e.g., input device 250) (e.g., the touch panel 252 or the pen sensor 254) and store the payment information in a required form at the memory 360 or a separate built-in security module.

Figure 4:
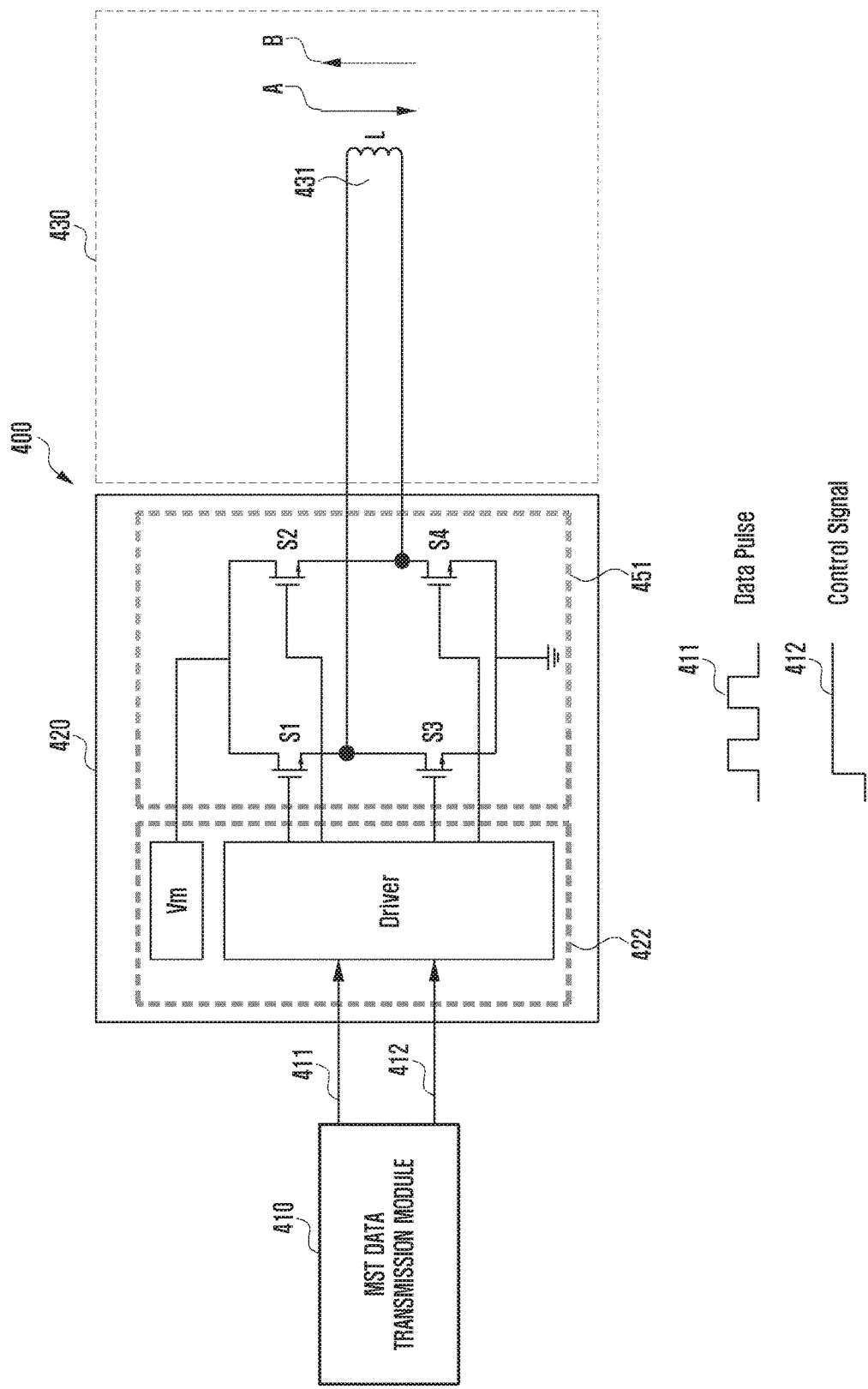
FIG. 4 is a block diagram illustrating an electronic device that can perform a payment function using MST according to various embodiments of the disclosure.

FIG. 4 is a block diagram illustrating an electronic device that can perform a payment function using MST according to various embodiments of the disclosure.

Referring to FIG. 4, an electronic device 400 (e.g., electronic device 101) according to various embodiments may include an MST data transmission module 410, MST control module 420 (e.g., MST control module 330), and MST output module 430 (e.g., MST module 310).

The MST data transmission module 410 may transmit, for example, necessary information upon payment to the MST control module 420. According to an embodiment, the MST data transmission module 410 may be a processor (e.g., processor 350) or a trust zone (secure world) within the processor 350. Alternatively, the MST data transmission module 410 may be a security module (eSE/UICC) built into the electronic device 400.

According to an embodiment, the MST data transmission module 410 may transmit a control signal 412 for enabling the MST output module 430 for a necessary time (e.g., a time taken in periodically transmitting an MST signal by the determined number) together with a data pulse 411. According to another embodiment, the MST data transmission module 410 may transmit differential form data having different phases. According to another embodiment, the MST data transmission module 410 may divide and sequentially transmit data included in the magnetic card on a time basis or may interleavedly dispose and transmit each data. In another example, the MST data transmission module 410 may change (e.g., change order of 11110101 to 10101111) and transmit at least some of data included in the magnetic card. In another example, the MST data transmission module 410 may sequentially transmit a simple sequence (e.g., including one track data for one period), a composite sequence (including a plurality of track data for one period), and a simple sequence and a composite sequence.

The MST control module 420 may include a data reception module 422 and an output conversion module 451. According to an embodiment, the data reception module 422 of the MST control module 420 may recognize a low/high state of transmitted pulses to data (e.g., 0 or 1 bit). Alternatively, the data reception module 422 may determine the transition number between low/high for a designated time and recognize the transition number to data. For example, for a designated time, the transition number between low/high is 1, the data reception module 422 may recognize it to 0 (zero) bit, and the transition number between low/high is 5, the data reception module 422 may recognize it to 1 (one) bit. According to an embodiment, in order to transfer data recognized in the data reception module 422 to the MST output module 430, the output conversion module 451 of the MST control module 420 may include a circuit for converting the recognized data to a necessary form. According to an embodiment, the circuit may include a first switch S1, second switch S2, third switch S3, and fourth switch S4. According to an embodiment, the first switch S1 and the fourth switch S4 may have the same control state, and the second switch S2 and the third switch S3 may have the same control state.

According to an embodiment, a direction of a voltage supplied to both ends of a loop antenna 431 may be changed according to a control state of the switch. In this case, a voltage level supplied to the loop antenna 431 may be Vm. For example, in a zero bit, the data reception module 422 may turn on the first switch S1 and the fourth switch S4, and turn off the second switch S2 and the third switch S3 or vice versa. For example, in one bit, the data reception module 422 may turn off the first switch S1 and the fourth switch S4 and turn on the second switch S2 and the third switch S3 or vice versa.

According to an embodiment, the output conversion module 451 may change a direction (a direction of a current) of a voltage supplied to both ends of the loop antenna 431 according to data recognized in the data reception module 422 to change a direction of a magnetic field transmitted to an external device (e.g., a POS terminal) through the loop antenna 431. For example, in a zero bit, a voltage level applied to the loop antenna 431 may be Vm and a direction of a current applied to the loop antenna 431 may be a direction A. For another example, in one bit, a voltage level applied to the loop antenna 431 may be Vm, and a direction of the current may be a direction B opposite to the direction A. According to an embodiment, a magnetic field generated in the loop antenna 431 may be similar to a magnetic field generated while a magnetic card is swiped in the POS terminal. According to an embodiment, the above switches S1, S2, S3, and S4 may include at least one of an N-type transistor (e.g., a metal oxide semiconductor field effect transistor (MOSFET), P-type transistors, and relay.

The MST output module 430 may include, for example, the loop antenna 431. According to an embodiment, the MST output module 430 may further include an inductor, capacitor, and resistor. According to another embodiment, the MST output module 430 may further include an amplifier for amplifying a signal. The loop antenna 431 may be used for NFC or wireless charging. According to another embodiment, a plurality of loop antennas 431 may exist.

Figure 5A:
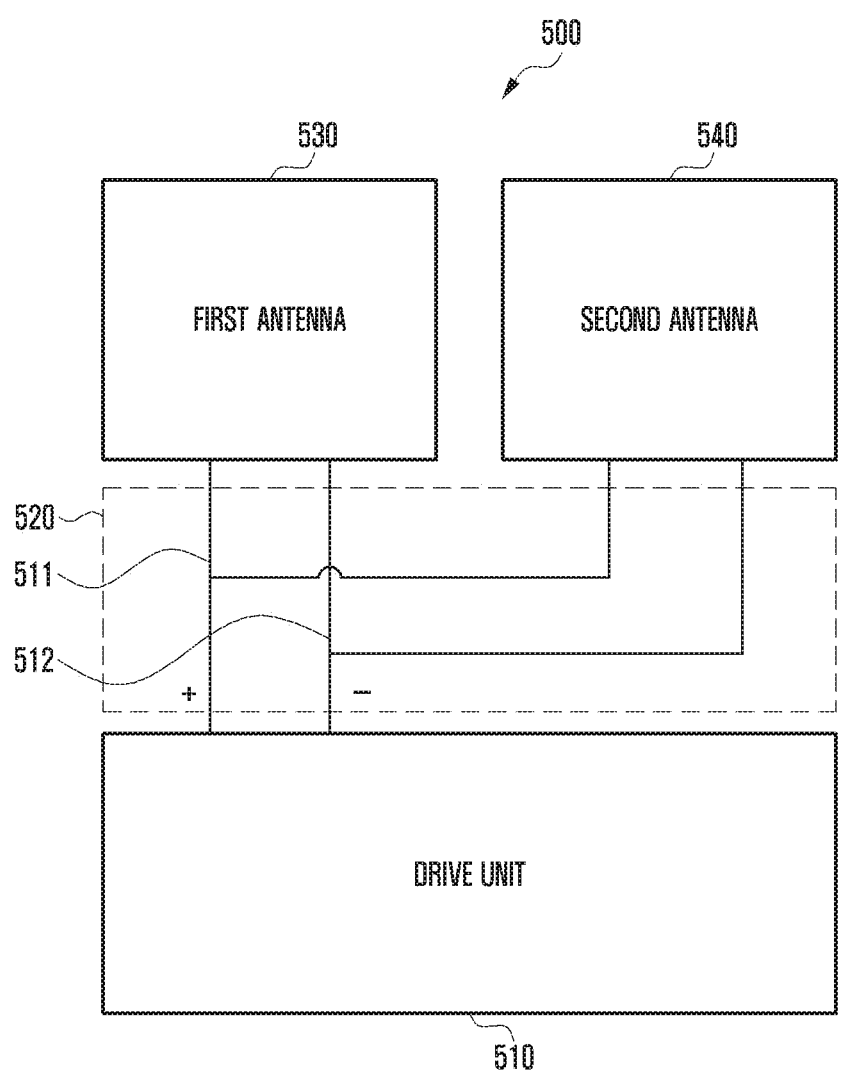
FIGS. 5A and 5B are block diagrams illustrating an MST module having two loop antennas according to various embodiments of the disclosure.
Figure 5B:
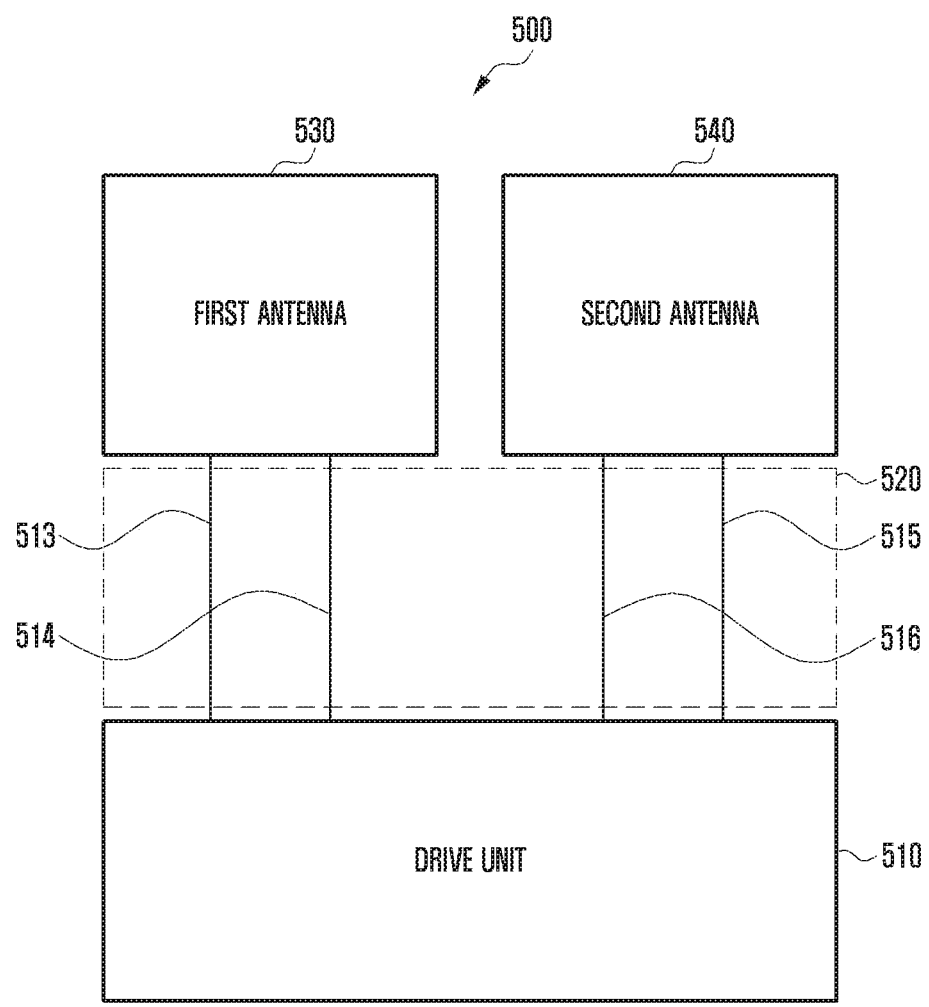

FIGS. 5A and 5B are block diagrams illustrating an MST module having two loop antennas according to various embodiments of the disclosure.

Referring to FIGS. 5A and 5B, an MST module 500 (e.g., MST module 310) according to various embodiments of the disclosure may include a drive unit 510 (e.g., MST data transmission module 410), connecting portion 520, first loop antenna 530, and second loop antenna 540.

According to an embodiment, the first loop antenna 530 and the second loop antenna 540 may be different type antennas. For example, one of the antennas may be a flat type antenna and another one thereof may be a solenoid type antenna. Further, when the MST module 500 includes a solenoid type antenna, at least some thereof may be positioned inside the housing (e.g., a housing having a cover 609) made of a non-conductive material. According to another embodiment, the first loop antenna 530 may be an antenna for MST, and the second loop antenna 540 may be an antenna for NFC.

According to an embodiment, the first loop antenna 530 and the second loop antenna 540 may transmit the same MST signal. For example, as shown in FIG. 5A, in the drive unit 510, a first electrode 511 and a second electrode 512 are formed, and the connection portion 520 may electrically connect the first electrode 511 to each of the first loop antenna 530 and the second loop antenna 540 and electrically connect the second electrode 512 to each of the first loop antenna 530 and the second loop antenna 540. According to an embodiment, the first loop antenna 530 and the second loop antenna 540 each may receive a current from the first electrode 511 or the second electrode 512 through the connection portion 520, form a magnetic field by a supplied current, and emit a magnetic field signal (MST signal) of a specific frequency to the outside. For example, the first loop antenna 530 and the second loop antenna 540 may receive a simple sequence or a composite sequence from the drive unit 510 through the connection portion 520 and convert the simple sequence or the composite sequence to a magnetic field signal and to sequentially transmit the magnetic field signal.

According to another embodiment, the first loop antenna 530 and the second loop antenna 540 may transmit different MST signals. For example, as shown in FIG. 5B, in the drive unit 510, a third electrode 513 and a fourth electrode 514 may be formed in a pair and a fifth electrode 515 and a sixth electrode 516 may be formed in another pair. The connection portion 520 may electrically connect the third electrode 513 and the fourth electrode 514 to the first loop antenna 530 and electrically connect the fifth electrode 515 and the sixth electrode 516 to the second loop antenna 540. According to an embodiment, the first loop antenna 530 may receive a current from the third electrode 513 or the fourth electrode 514 through the connecting portion 520, form a magnetic field by the supplied current, and emit a RF signal of a specific frequency to the outside. The second loop antenna 540 may receive a current from the fifth electrode 515 or the sixth electrode 516 through the connecting portion 520, form a magnetic field by the supplied current, and emit the magnetic field to the outside.

Figure 6:
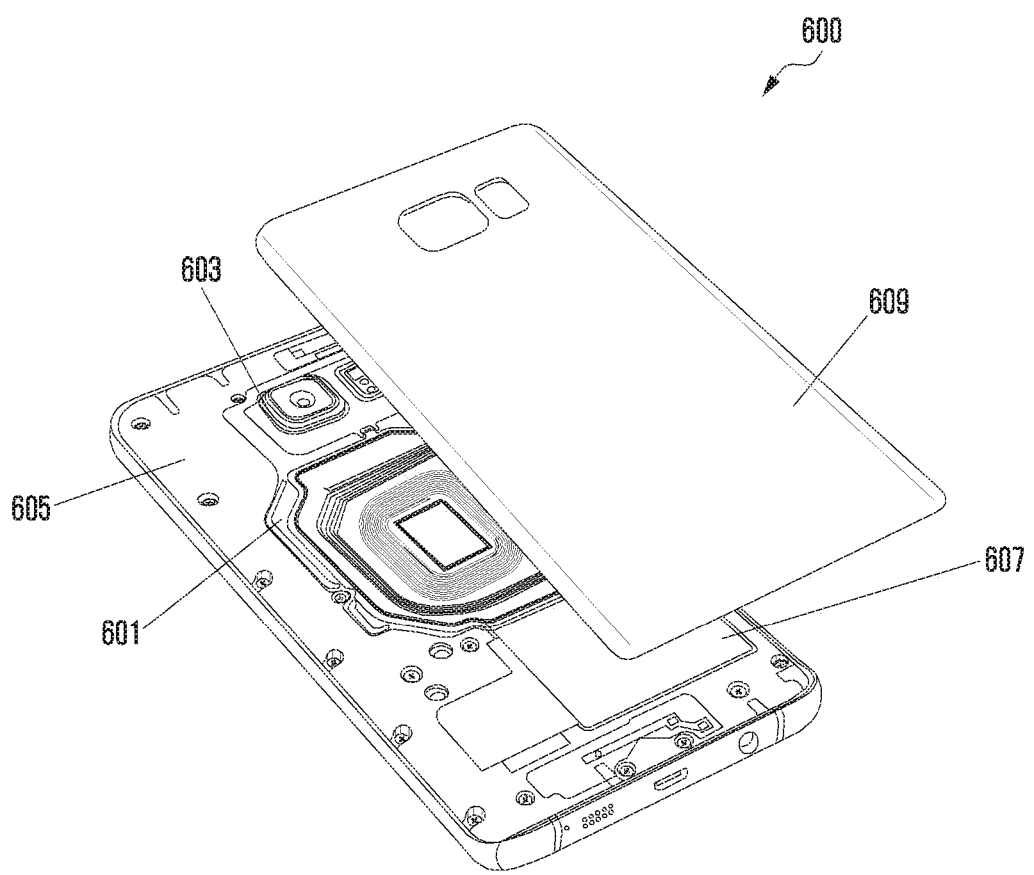
FIG. 6 is a perspective view illustrating a rear surface of an electronic device according to various embodiments of the disclosure.

FIG. 6 is a perspective view illustrating a rear surface of an electronic device according to various embodiments of the disclosure. FIG. 6 is a view illustrating a detached state of a cover positioned at a rear surface of the electronic device.

Referring to FIG. 6, an electronic device 600 (e.g., electronic device 101) may include a housing 605 that receives and fixes components. According to an embodiment, the housing 605 may include a first surface facing in a first direction (e.g., a direction penetrating through a front surface of the display (or the cover glass) of the electronic device), a second surface facing in a second direction (e.g., another direction penetrating through a rear surface in which a display of the electronic device is not positioned) opposite to the first direction, and a side member that encloses at least some of a space between the first and second surfaces. For example, the first surface may be a surface in which the display is positioned, and the second surface may be a surface in which a cover is positioned at a rear surface of the electronic device. According to some embodiments, the electronic device may include a first display and a second display disposed at the front surface and the rear surface, respectively, and in this case, the first surface may be a surface in which the first display is positioned, and the second surface may be a surface in which the second display is positioned.

According to an embodiment, at the inside of the housing 605, components such as a flexible printed circuit board (FPCB) 601 in which at least one coil constituting a loop antenna (e.g., first loop antenna 530 or second loop antenna 540) is disposed, a camera 603 (e.g., camera module 291), or a battery 607 (e.g., battery 296) may be positioned. FIG. 6 illustrates that the cover 609 is detached from the electronic device 600, but various embodiments of the disclosure are not limited to a configuration in which the cover 609 is separated from the electronic device 600 by a general user. According to an embodiment, a coil constituting a loop antenna (e.g., first loop antenna 530 or second loop antenna 540) for performing a payment function may be mounted in the FPCB 601. According to an embodiment, when viewed from a rear surface of the electronic device 600, the FPCB 601 may be positioned at a central portion of the electronic device 600. According to another embodiment, when viewed from a rear surface of the electronic device 600, the FPCB 601 may be extended from a central portion to an upper portion (e.g., a peripheral portion of other components (e.g., the camera 603 or an ornament)) of the electronic device 600, and the extended portion may include a coil. According to another embodiment, the FPCB 601 may be extended in a lower direction (e.g., a portion in which the battery 607 is positioned) from a central portion of the electronic device 600, and an extended portion may include a coil.

Figure 7:
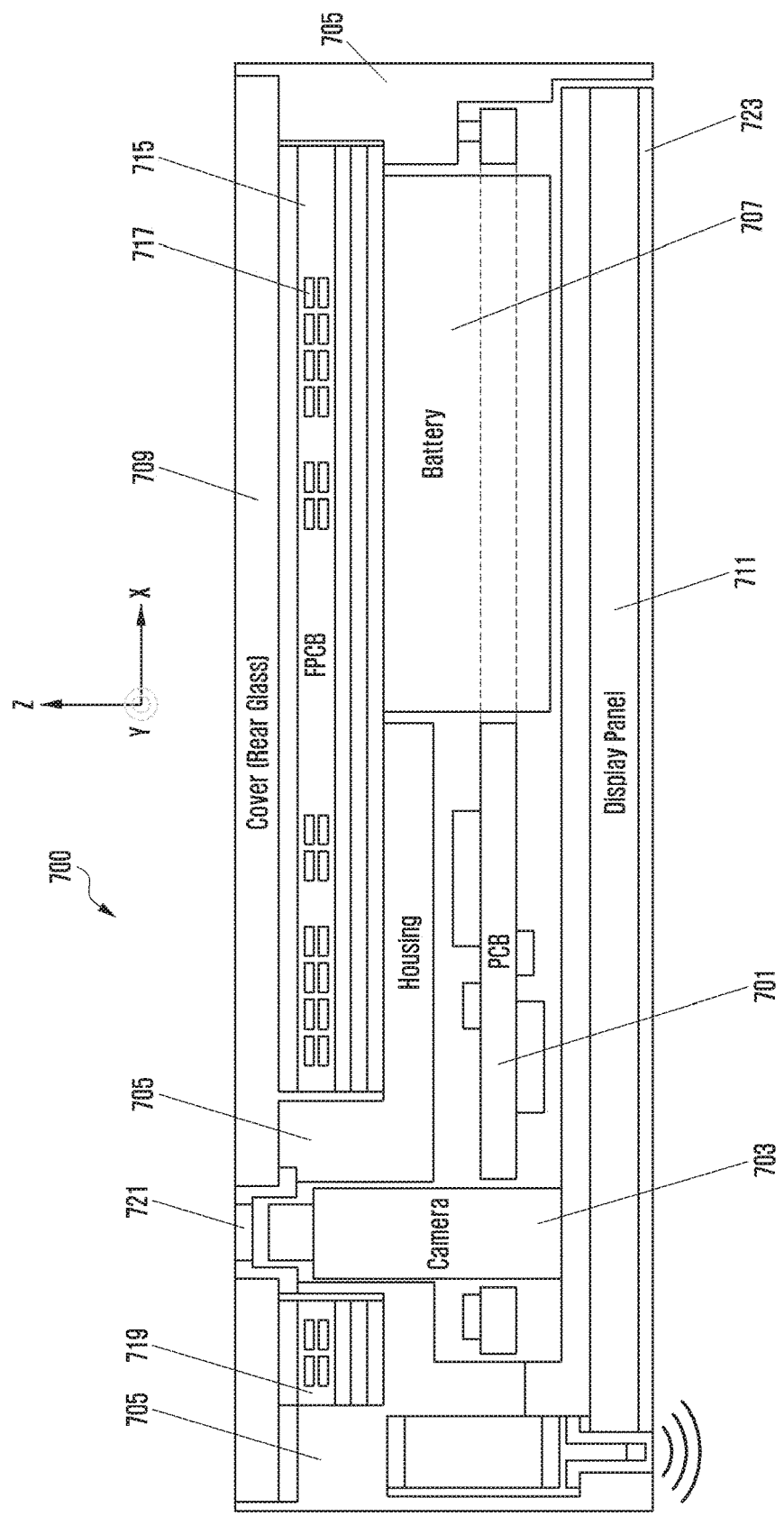
FIG. 7 is a schematic cross-sectional view illustrating an electronic device according to various embodiments of the disclosure.

FIG. 7 is a schematic cross-sectional view illustrating an electronic device according to various embodiments of the disclosure.

Referring to FIG. 7, an electronic device 700 (e.g., electronic device 101) may include a housing 705 (e.g., housing 605) for receiving and fixing at least one component or a cover fastened to the housing 705 at a rear surface of the electronic device 700. The components may include, for example, a display panel 711, board 701, battery 707, camera 703, and FPCB 715 (e.g., FPCB 601) positioned inside the housing 705.

The display panel 711 may be attached to, for example, a glass (window cover) 723 positioned at a front surface of the electronic device. According to an embodiment, the display panel 711 may be integrally formed with a touch sensor (e.g., touch panel 252) or a pressure sensor. According to another embodiment, the touch panel 252 or the pressure sensor may be separated from the display panel 711. For example, the touch panel 252 may be positioned between the glass 723 and the display panel 711.

The board 701 may mount, for example, components such as a communication module (e.g., communication module 220) or a processor (e.g., processor 120). According to an embodiment, the board 701 may be implemented using at least one of a printed circuit board (PCB) and a flexible printed circuit board (FPCB). According to an embodiment, the board 701 may operate as a ground plate that can ground at least one loop antenna 717.

A cover 709 may be divided into, for example, a conductive area made of a conductive material and a non-conductive area made of a non-conductive material. For example, the cover 709 may be divided into a conductive area and a non-conductive area positioned at one side or both sides of the conductive area. According to an embodiment, in the cover 709, at least one opening 721 for exposing some components of the electronic device 700 to the outside may be formed. For example, the cover 709 may include the at least one opening 721 for exposing the camera 703, flash, or sensor (e.g., fingerprint sensor).

According to an embodiment, the FPCB 715 may be attached to a lower surface of the cover 709. According to an embodiment, the FPCB 715 may mount the at least one loop antenna 717 and be positioned to be electrically insulated from a conductive area of the cover 709.

According to an embodiment, when viewed from a rear surface of the electronic device 700, the FPCB 715 may be extended from a central portion of the electronic device 700 to an upper portion 719 (e.g., a peripheral portion of the camera 703) thereof, and the upper portion 719 may include a coil, which is a portion of the at least one loop antenna 717. According to another embodiment, the FPCB 715 may be extended in a lower direction (e.g., a portion in which the battery 707 is positioned) from the central portion of the electronic device 700, and an extended portion may include a coil, which is a portion of the at least one loop antenna 717.

According to another embodiment, in the FPCB 715, the upper portion 719 extended from a central portion of the electronic device 700 to an upper portion (e.g., a peripheral portion of the camera 703) thereof may be removed. According to various embodiments of the disclosure, by removing the upper portion 719 of the FPCB 715, performance degradation due to interference between the at least one loop antenna 717 and other antennas (long term evolution (LTE), global positioning system (GPS), or wireless fidelity (WI-FI)) positioned at a periphery of the camera 703 can be prevented, and negative design factors such as mechanical design restriction or mechanical rigidity weakening can be prevented.

According to an embodiment, the at least one loop antenna 717 may be formed in the same type. For example, the at least one loop antenna 717 may be configured with a flat type coil. According to another embodiment, a portion of the at least one loop antenna 717 may be configured with a flat type coil, and another portion thereof may be configured with a solenoid type coil.

According to various embodiments, a portion of the at least one loop antenna 717 may be configured to generate a magnetic field of a vertical direction (Z-axis direction) at a rear surface (XY plane) of the electronic device 700, and another portion thereof may be configured to form a magnetic field in a direction horizontal to a rear surface (XY plane) of the electronic device 700.

Figure 8A:
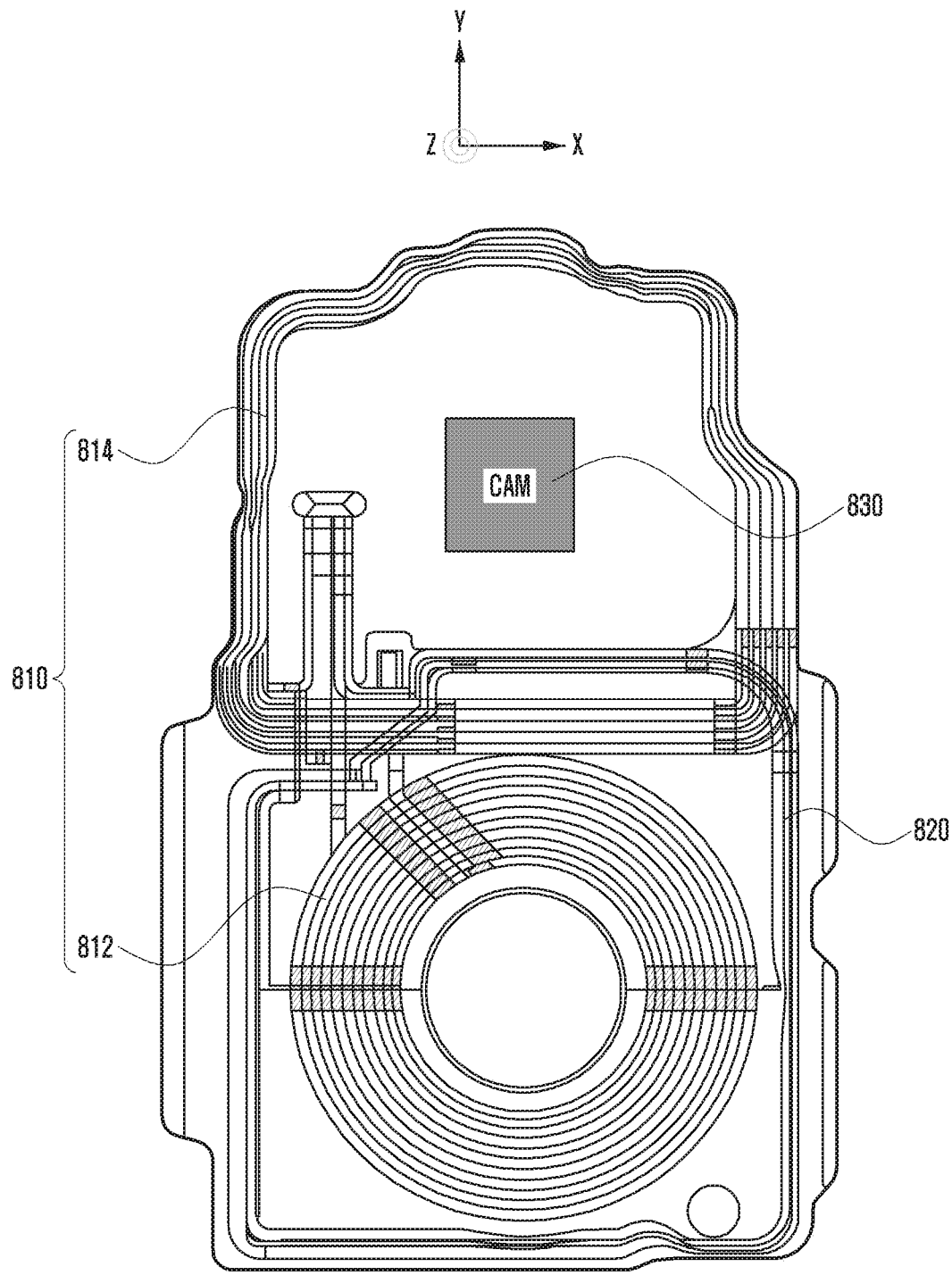
FIGS. 8A and 8B are front views illustrating an MST module having a loop antenna according to various embodiments of the disclosure.
Figure 8B:
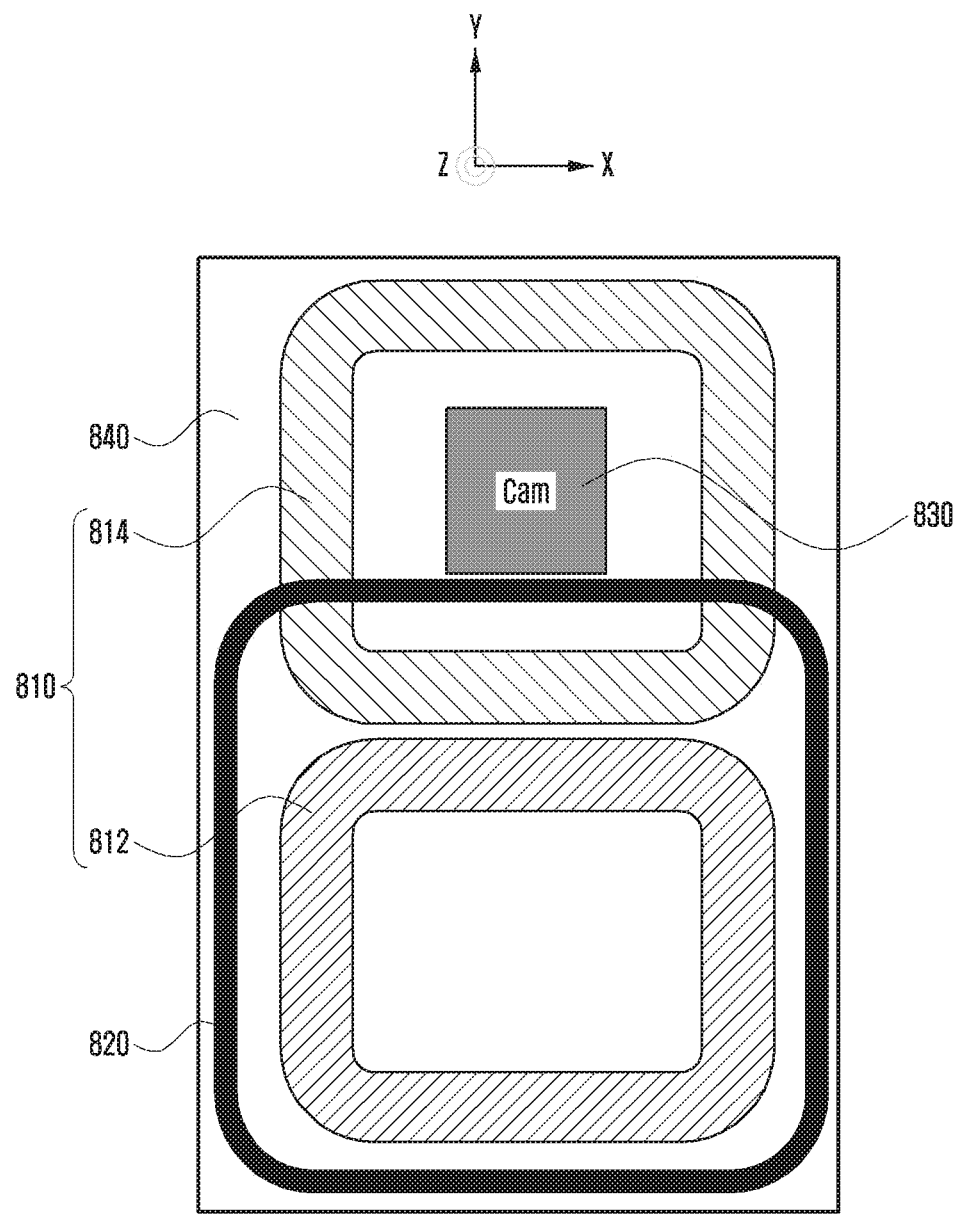

FIGS. 8A and 8B are front views illustrating an MST module having a loop antenna according to an embodiment of the disclosure. FIG. 8A is a view illustrating in a layout form an FPCB in which a loop antenna for MST is mounted according to a comparative example. FIG. 8B is a view illustrating in a layout form an FPCB in which a loop antenna for MST is mounted according to a comparative example.

Referring to FIGS. 8A and 8B, an MST module 810 according to a comparative example may include a first loop antenna 812, second loop antenna 814, or shielding member 840.

The first loop antenna 812 may be positioned, for example, at a central portion of the electronic device (e.g., electronic device 700). For example, when viewed from a rear surface (XY plane) of the electronic device 700, the first loop antenna 812 may be positioned at a central portion of the electronic device 700 and be formed with a conductive coil having a plurality of turns. In an outer portion of the first loop antenna 812, an NFC antenna 820 may be positioned.

The second loop antenna 814 may be positioned, for example, at an upper end portion of the electronic device (e.g., electronic device 700). For example, when viewed from a rear surface (XY plane) of the electronic device 700, the second loop antenna 814 may be positioned to enclose an outer portion of a camera 830 and be formed with a conductive coil having a plurality of turns.

The shielding member 840 may be positioned, for example, at a lower portion of the first loop antenna 812 and the second loop antenna 814.

Figure 9A:
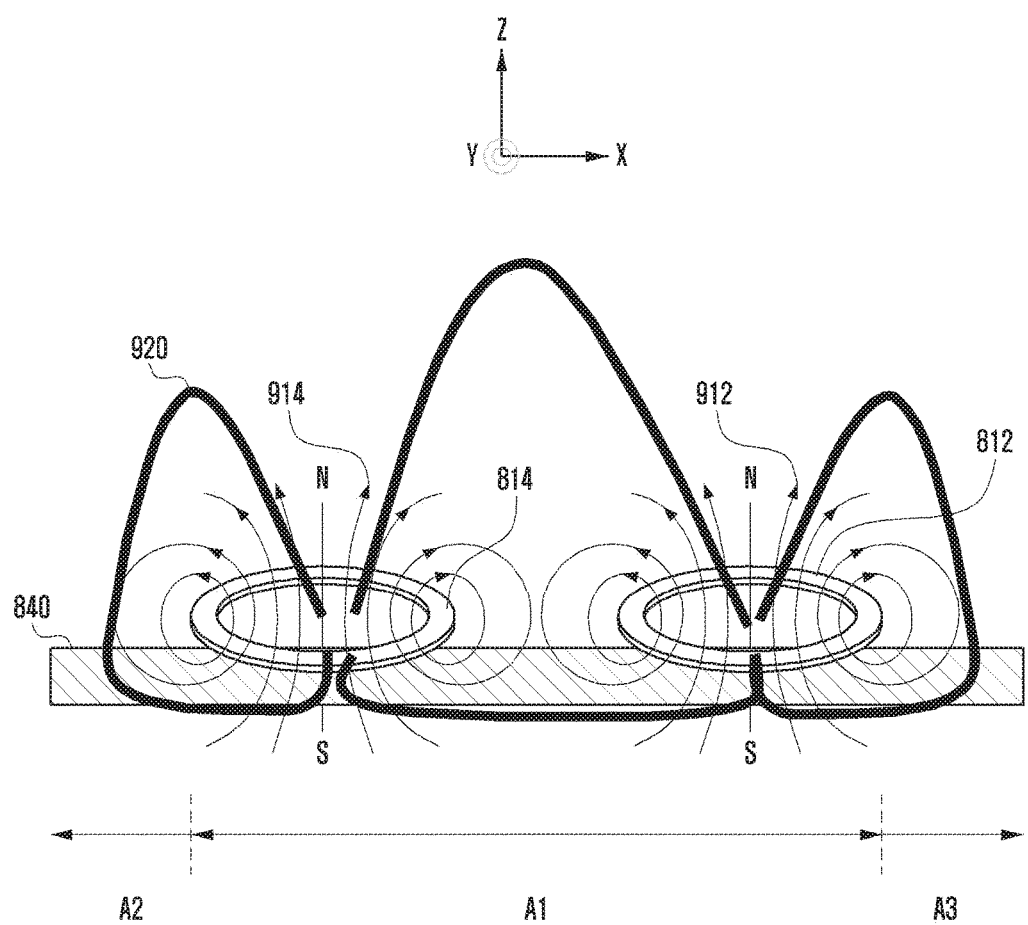
FIGS. 9A and 9B are diagrams illustrating a magnetic field generated in an MST module having two loop antennas according to various embodiments of the disclosure.
Figure 9B:
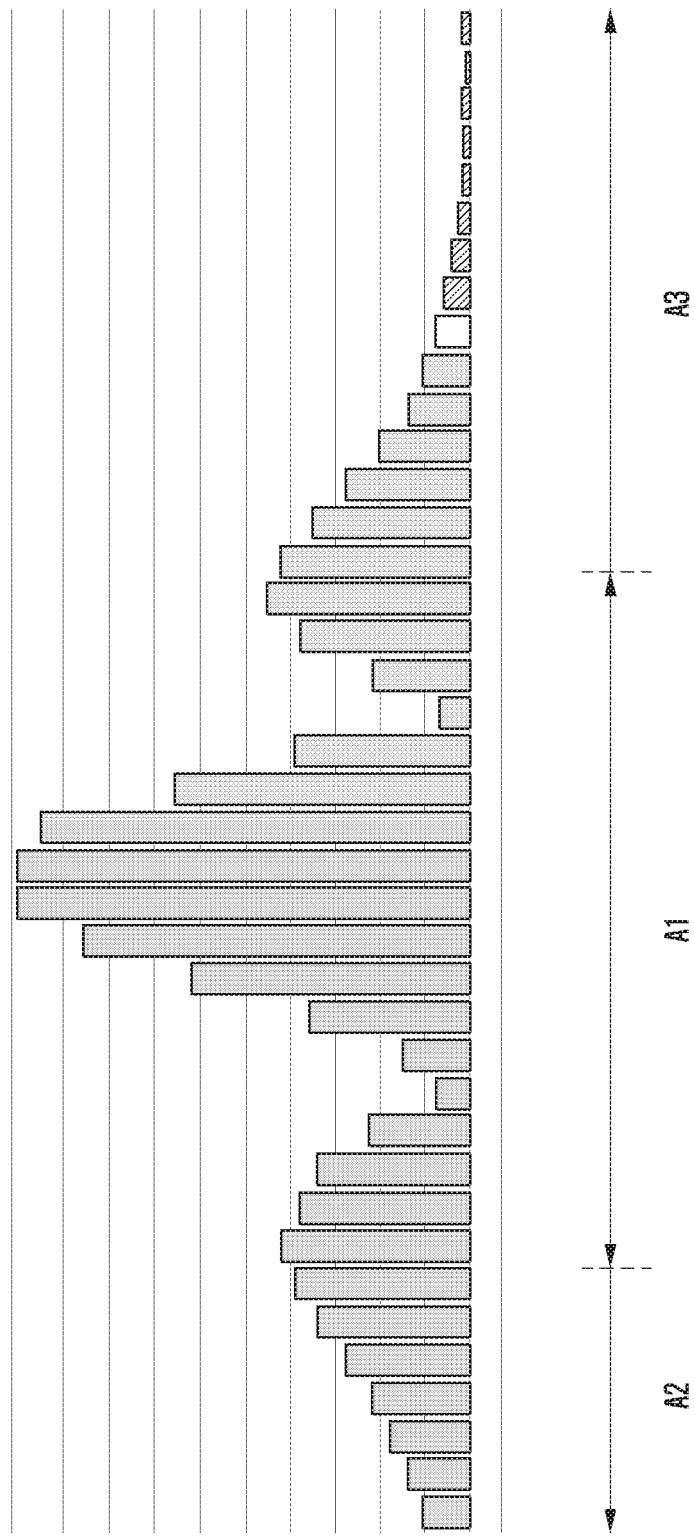

FIGS. 9A and 9B are diagrams illustrating a magnetic field generated in an MST module having two loop antennas according to an embodiment of the disclosure. FIG. 9A is a view illustrating a magnetic flux generated in an MST module having two loop antennas according to a comparative example. FIG. 9B is a graph measuring intensity of a magnetic field generated in an MST module having two loop antennas according to a comparative example. A cross section of the MST module of FIGS. 8A and 8B may be the same as or similar to that of FIG. 9A.

Referring to FIG. 9A, each of the first loop antenna 812 and the second loop antenna 814 may form a magnetic field (or magnetic wave) 920 in a direction of a Z-axis perpendicular to a rear surface (XY plane) of the electronic device 700. For example, a first magnetic flux 912 generated in the first loop antenna 812 is emitted in a Z-axis direction, and a second magnetic flux 914 generated in the second loop antenna 814 may be emitted in a Z-axis direction.

Referring to FIGS. 9A and 9B, the electronic device (e.g., electronic device 700) according to a comparative example may have two loop antennas for performing a payment function using MST and dispose two loop antennas at a central portion A1 of the electronic device 700 and an upper end portion A2, respectively, of the electronic device 700 in which the camera 703 is positioned, thereby enlarging distribution of a magnetic field generated in the loop antenna. The electronic device includes a lower end portion A3.

However, in the electronic device 700 according to a comparative example, performance degradation may occur due to mutual interference between a loop antenna and other antennas (LTE, GPS, or WI-FI) positioned at a periphery thereof. Alternatively, in the electronic device 700 according to the comparative example, negative design factors such as mechanical design restriction and the mechanical rigidity weakening may occur.

Figure 10A:
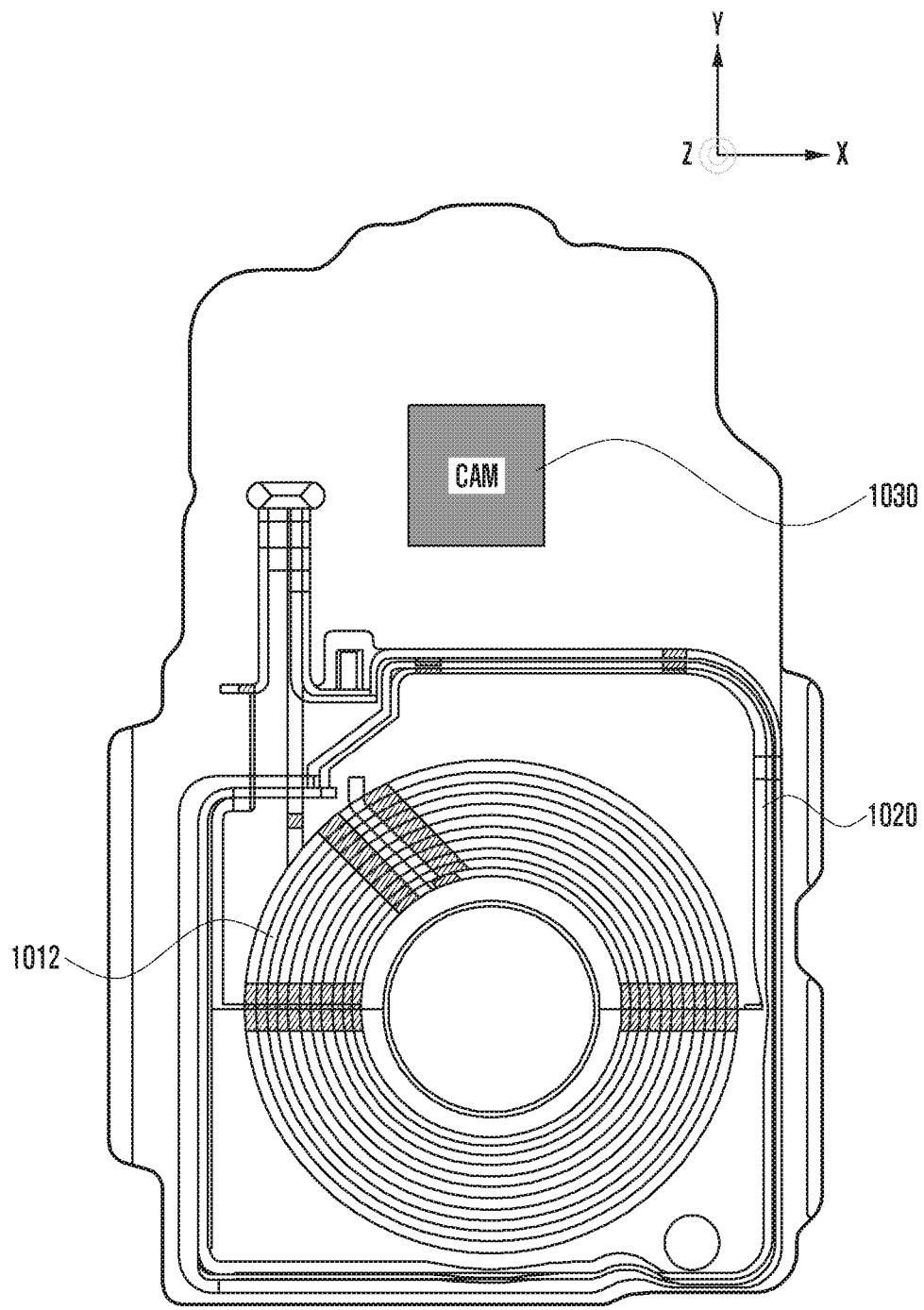
FIGS. 10A and 10B are front views illustrating an MST module having a loop antenna according to various embodiments of the disclosure.
Figure 10B:
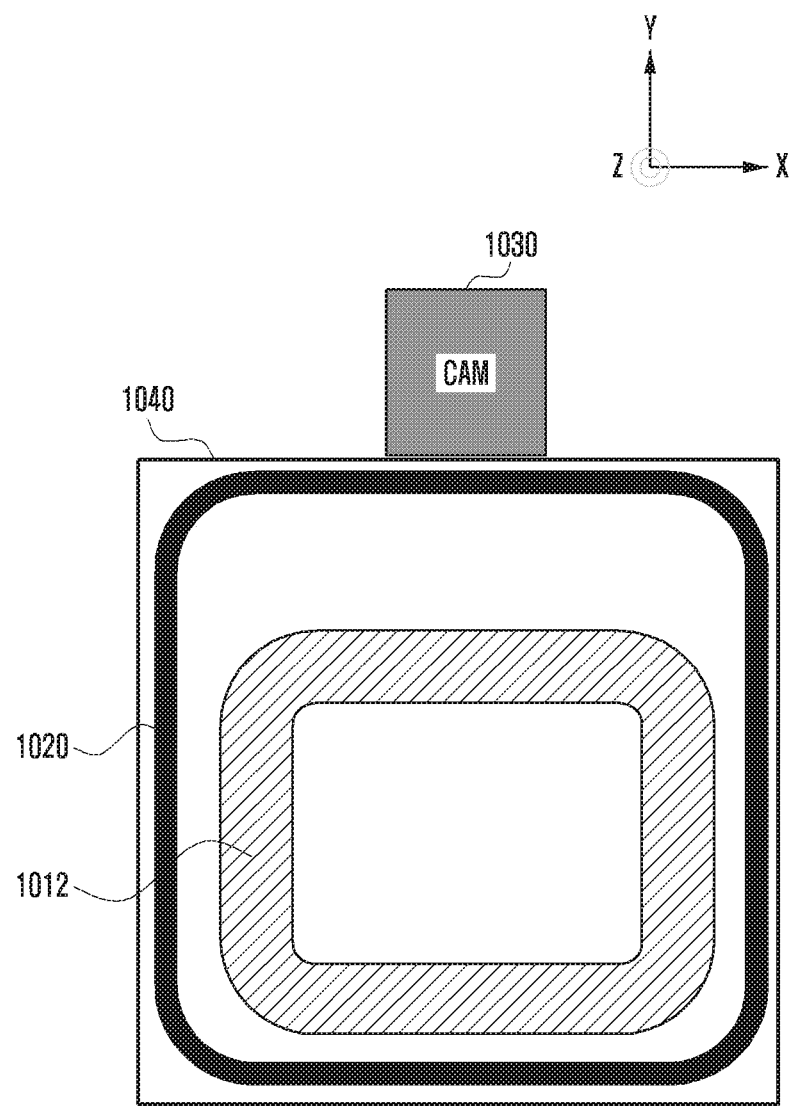

FIGS. 10A and 10B are front views illustrating an MST module having a loop antenna according to an embodiment of the disclosure. FIG. 10A is a view illustrating in a layout form an FPCB in which a loop antenna for MST is mounted according to another comparative example. FIG. 10B is a view illustrating in a layout form an FPCB in which a loop antenna for MST is mounted according to another comparative example.

Referring to FIGS. 10A and 10B, an MST module according to another comparative example may include a loop antenna 1012 or a shielding member 1040 (e.g., a metal plate).

The loop antenna 1012 may be positioned, for example, at a central portion of the electronic device (e.g., electronic device 700). For example, the loop antenna 1012 may be positioned at a central portion of the electronic device 700 when viewed from a rear surface (XY plane) of the electronic device 700 and be configured with a conductive coil having a plurality of turns. In an outer portion of the loop antenna 1012, an NFC antenna 1020 may be positioned.

The shielding member 1040 may be positioned, for example, at a lower portion of the loop antenna 1012.

Unlike the MST module of FIGS. 8 and 9, in a MST module according to another comparative example, two loop antennas 814 positioned at the upper end portion A2 of the electronic device 700 may be removed.

Figure 11A:
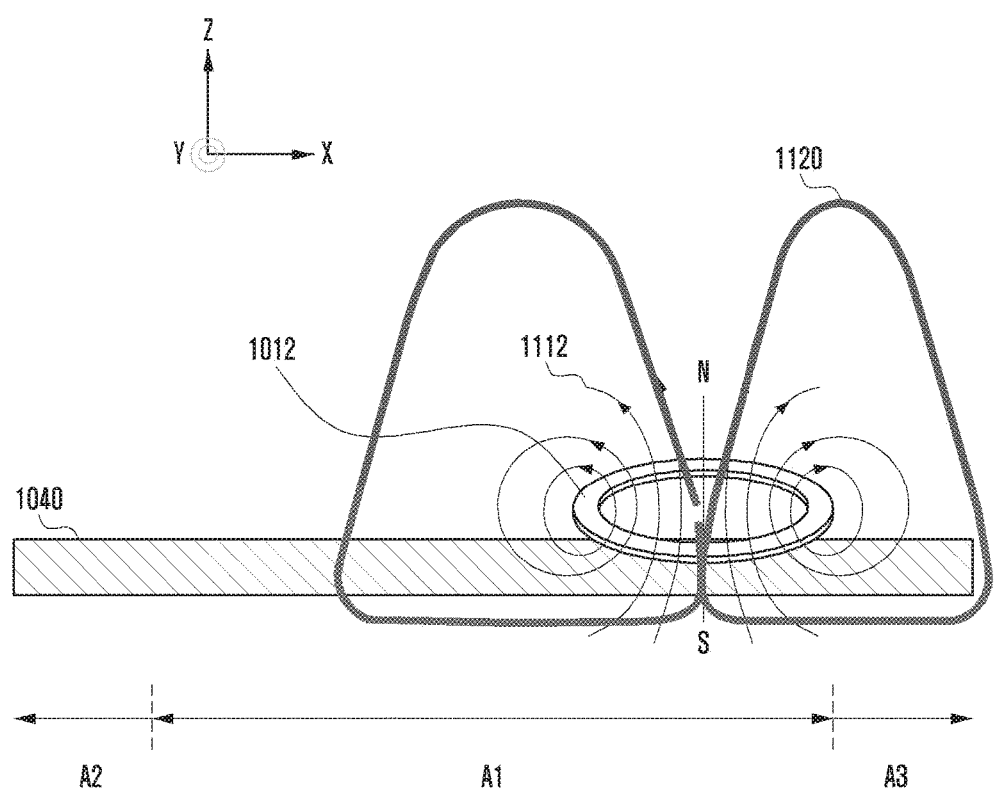
FIGS. 11A and 11B are diagrams illustrating a magnetic field generated in an MST module having a loop antenna according to various embodiments of the disclosure.
Figure 11B:
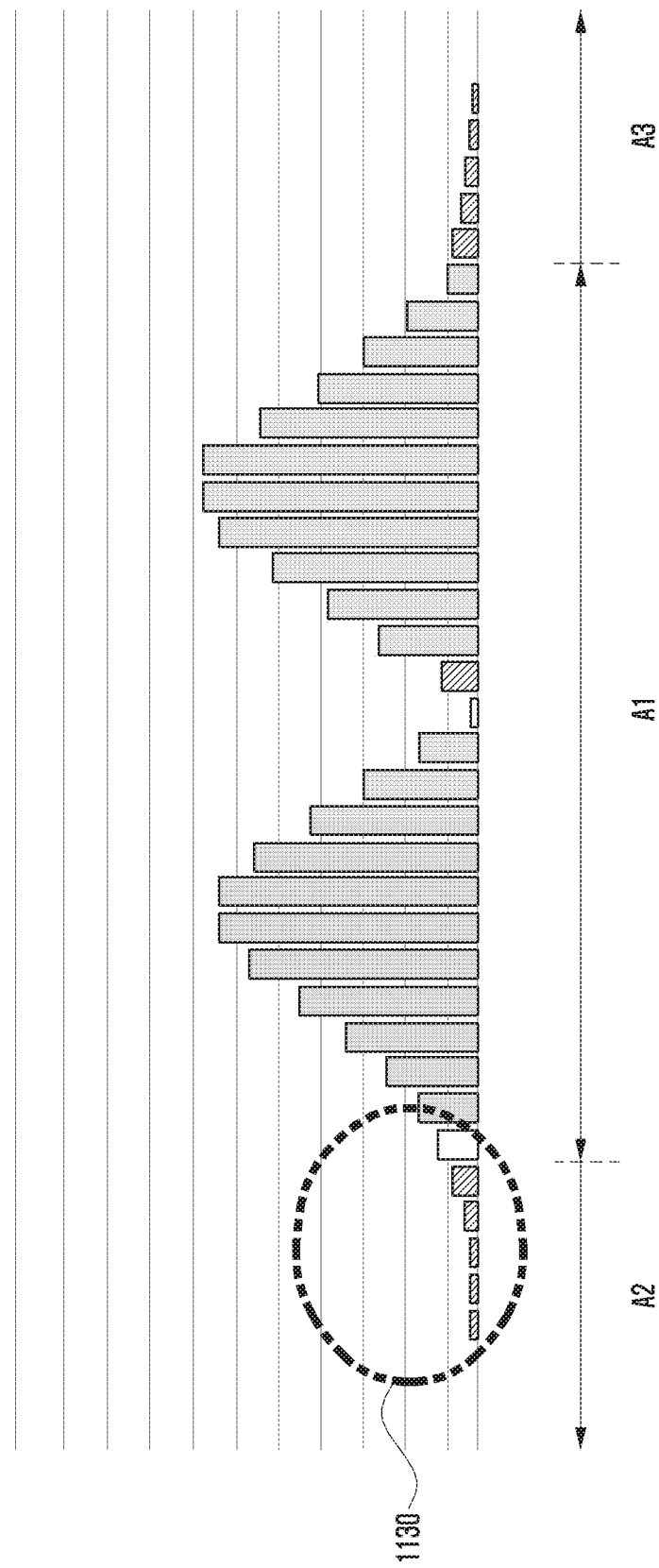

FIGS. 11A and 11B are diagrams illustrating a magnetic field generated in an MST module having a loop antenna according to an embodiment of the disclosure. FIG. 11A is a diagram illustrating a magnetic flux generated in an MST module according to another comparative example. FIG. 11B is a graph measuring intensity of a magnetic field generated in an MST module according to another comparative example. A cross section of the MST module of FIGS. 10A and 10B may be the same as or similar to that of FIG. 11A.

Referring to FIG. 11A, the loop antenna 1012 may form a magnetic field (or magnetic wave) 1120 in a direction of a Z-axis perpendicular to a rear surface (XY plane) of the electronic device 700. For example, a magnetic flux 1112 generated in the loop antenna 1012 may be emitted in a direction of a Z-axis.

In another comparative example, by removing the second loop antenna 814 positioned at the upper end portion A2 of the electronic device 700, negative design factors such as performance degradation, mechanical design restriction, or mechanical rigidity weakening due to mutual interference between other antennas (LTE, GPS, or WI-FI) and a loop antenna can be avoided. However, in another comparative example, because a magnetic field generated in the loop antenna is formed only in a central portion A1 of the electronic device 700, in the upper end portion A2 of the electronic device 700, intensity of a magnetic field may be relatively weakened.

Referring to FIG. 11B, as indicated by identification number 1130, unlike the central portion A1 of the electronic device 700, in the upper end portion A2 of the electronic device 700, a loop antenna performance, i.e., intensity of the magnetic field is lowered.

Figure 12A:
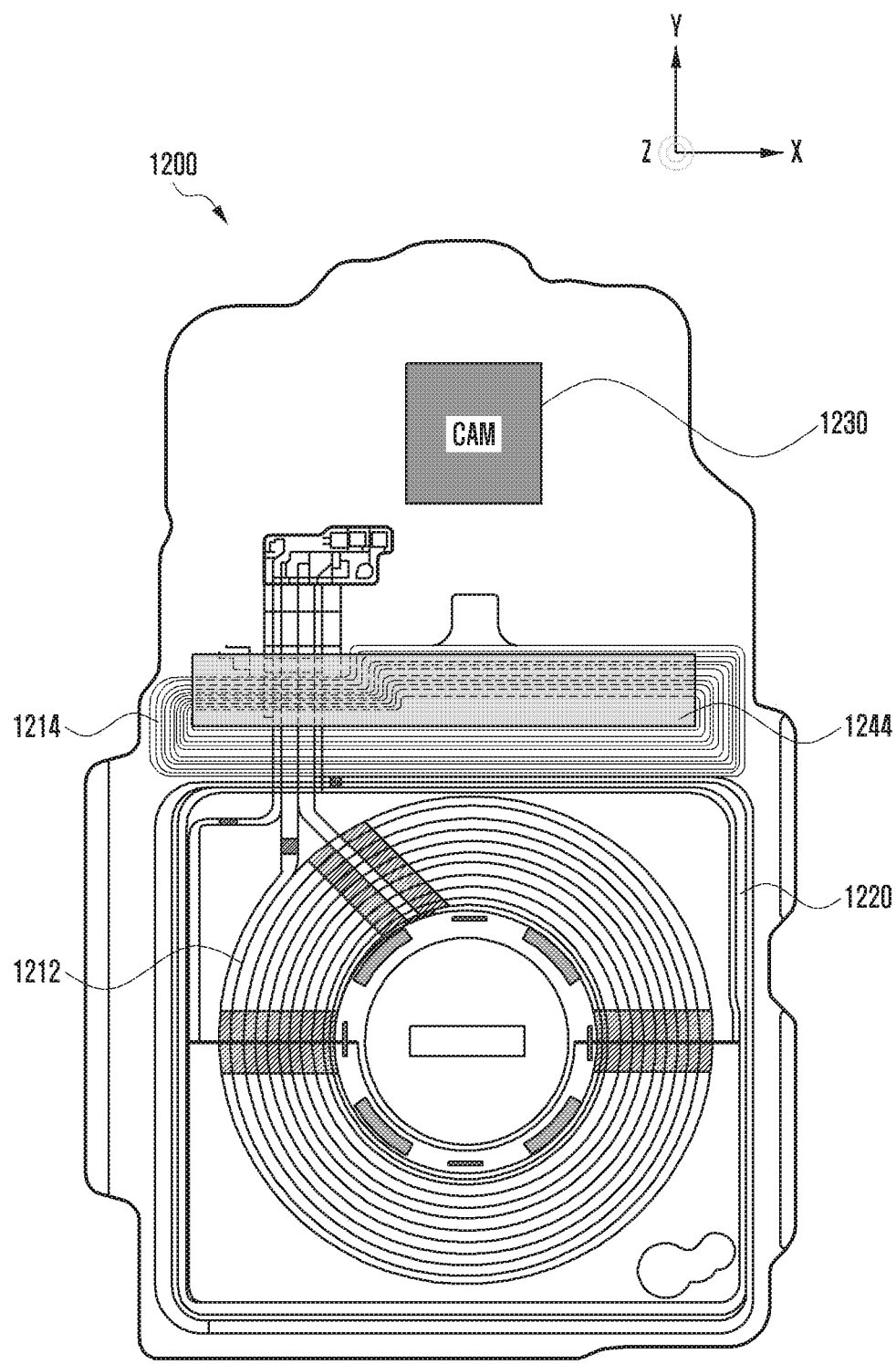
FIGS. 12A and 12B are front views illustrating an MST module having two loop antennas according to an embodiment of the disclosure.
Figure 12B:
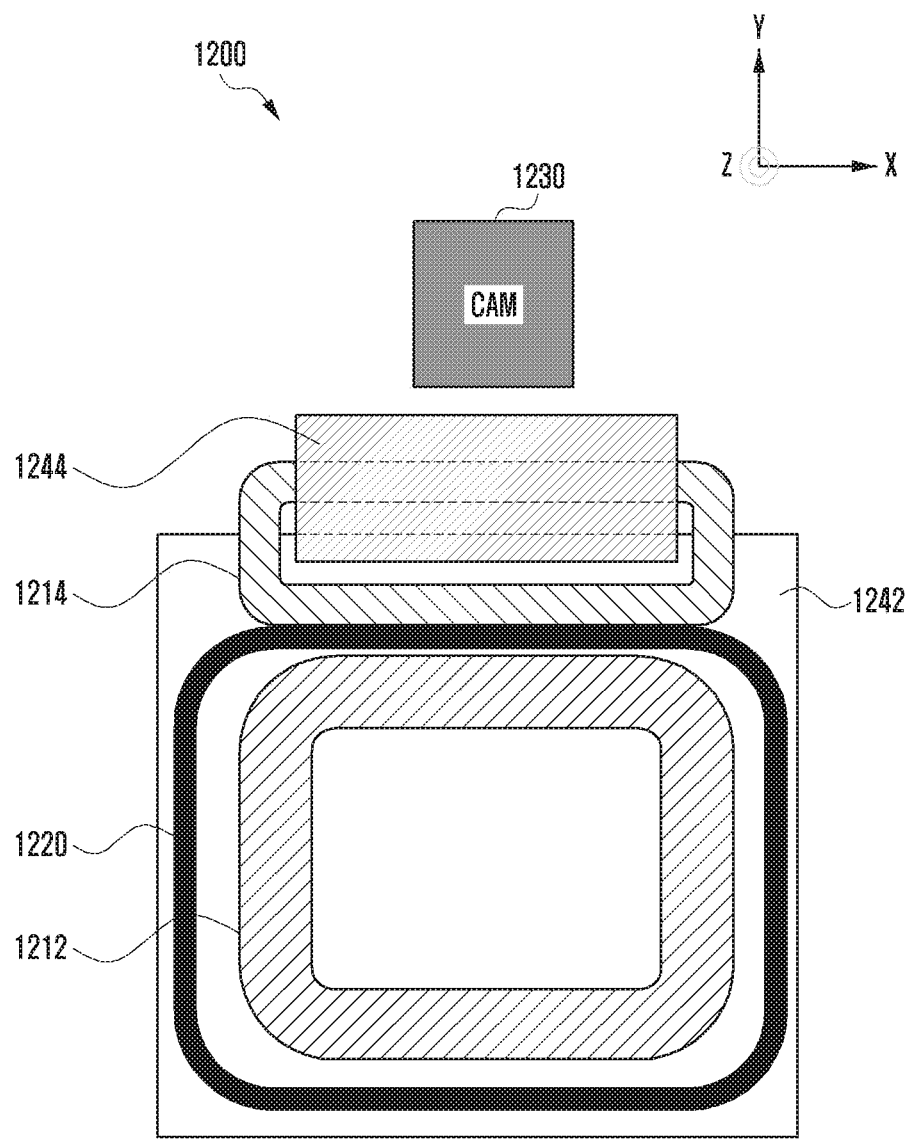

FIGS. 12A and 12B are front views illustrating an MST module having two loop antennas according to an embodiment of the disclosure. FIG. 12A is a view illustrating in a layout form an FPCB in which a loop antenna for MST is mounted according to an embodiment of the disclosure. FIG. 12B is a view illustrating in a layout form an FPCB in which a loop antenna for MST is mounted according to an embodiment of the disclosure.

Referring to FIGS. 12A and 12B, an MST module according to an embodiment of the disclosure may include a first loop antenna 1212, second loop antenna 1214, first shielding member 1242 (e.g., a first metal plate), or second shielding member 1244 (e.g., a second metal plate).

The first loop antenna 1212 may be positioned, for example, at a central portion of an electronic device 1200 (e.g., the electronic device 700). According to an embodiment, the first loop antenna 1212 may be positioned at a central portion of the electronic device 1200 when viewed from a rear surface (XY plane) of the electronic device 1200 and be configured with a conductive coil having a plurality of turns. For example, the first loop antenna 1212 may be mounted in an FPCB (e.g., FPCB 715) attached to a lower surface of a cover (e.g., cover 709) positioned at a rear surface of the electronic device 1200 and be positioned to correspond to a central portion of the electronic device 1200. According to an embodiment, the first loop antenna 1212 may be configured with a flat type coil wound in a spiral shape about a Z-axis perpendicular to a rear surface (XY plane) of the electronic device 1200.

The second loop antenna 1214 may be spaced apart from, for example, the first loop antenna 1212, be positioned between a camera 1230 (e.g., camera 703) positioned at one side of the electronic device (e.g., electronic device 1200) and the first loop antenna 1212, and be formed with a conductive coil having a plurality of turns. For example, the second loop antenna 1214 may be mounted in the FPCB 715 attached to a lower surface of the cover 709 positioned at a rear surface of the electronic device 1200 and be positioned to correspond between the camera 1230 and the first loop antenna 1212. According to an embodiment, the second loop antenna 1214 may be configured with a flat type coil wound in a spiral shape about a Z-axis perpendicular to a rear surface (XY plane) of the electronic device 1200. In an electronic device according to various embodiments disclosed in this document, as a reference that defines a location of the loop antenna (e.g., first loop antenna 1212, second loop antenna 1214) or the shielding member (e.g., first shielding member 1242, second shielding member 1244), the camera (e.g., camera 1230) is described, but the camera (e.g., camera 1230) may be changed to or replaced with a plurality of components, devices, or ornaments positioned at one side (e.g., an upper end portion at a rear surface of the electronic device) of the electronic device. Further, positions of the first loop antenna (e.g., first loop antenna 1212), the second loop antenna 1214, and the first and second shielding members 1242 and 1244 corresponding thereto may be exchanged. The first shielding member 1242 may be positioned, for example, at a lower portion of the first loop antenna 1212 and the second loop antenna 1214. According to an embodiment, the first shielding member 1242 may operate as a core for increasing a magnetic force generated in the first loop antenna 1212 or the second loop antenna 1214. For example, a magnetic flux generated in the first loop antenna 1212 or the second loop antenna 1214 may be spread to a peripheral area of the first loop antenna 1212 or the second loop antenna 1214 via the first shielding member 1242 and be emitted to the outside through a portion of the cover 709.

The second shielding member 1244 may be positioned, for example, at an upper portion of the second loop antenna 1214. According to an embodiment, the second shielding member 1244 may operate as a core for increasing a magnetic force generated in the second loop antenna 1214. For example, a magnetic flux generated in the second loop antenna 1214 may be spread to a peripheral area of the second loop antenna 1214 via the second shielding member 1244 and be emitted to the outside through a portion of the cover 709. For example, a magnetic flux generated in the second loop antenna 1214 may be spread to an upper end portion of the electronic device 1200 in which the camera 1230 is positioned via the second shielding member 1244.

According to an embodiment, at least some of the second shielding member 1244 may be overlapped with the first shielding member 1242 to enable the second loop antenna 1214 to form the magnetic field (or magnetic wave) 920 in a direction horizontal to a rear surface (XY plane) of the electronic device 1200. For example, because a portion of the second shielding member 1244 is overlapped with the first shielding member 1242, a direction of a magnetic flux emitted from the second loop antenna 1214 formed with a flat type coil may be induced in a direction horizontal to a rear surface (XY plane) of the electronic device 1200. For example, although the second loop antenna 1214 is configured with a flat type coil, in a portion which one side area of the second shielding member 1244 and one side area of the first shielding member 1242 are overlapped, the second loop antenna 1214 is positioned between the first shielding member 1242 and the second shielding member 1244 to form a magnetic field of a form similar to that of a solenoid type coil. In the foregoing description, a magnetic field of a form similar to that of the solenoid type coil may mean, for example, a magnetic field emitted in a direction horizontal to a rear surface (XY plane) of the electronic device 1200 from the second loop antenna 1214. For example, a magnetic field of a form similar to that of the solenoid type coil may mean a magnetic field emitted to an upper end portion of the electronic device 1200 in which the camera 1230 is positioned.

According to an embodiment, the second shielding member 1244 and the first shielding member 1242 may be formed in one piece.

According to some embodiments, at least some of the second shielding member 1244 may be directly connected to a portion of the first shielding member 1242.

According to an embodiment, the first and second shielding members 1242 and 1244 each may include a plane substantially parallel to a cover (e.g., cover 709) positioned at a rear surface of the electronic device 1200.

According to an embodiment, the first and second shielding members 1242 and 1244 each may include a plate made of a magnetic material.

According to an embodiment, in an outer portion of the first loop antenna 1212, an NFC antenna 1220 may be positioned. The NFC antenna 1220 may be mounted, for example, in the FPCB 715 attached to a lower surface of a cover (e.g., cover 709) positioned at a rear surface of the electronic device 1200 and be made of a conductive coil. For example, when viewed from a rear surface (XY plane) of the electronic device 1200, the NFC antenna 1220 may be positioned to enclose an outer portion of the first loop antenna 1212 and be configured with a conductive coil having at least one turn. According to an embodiment, a portion of the NFC antenna 1220 may be overlapped with a portion of the second loop antenna 1214.

According to an embodiment, when a plurality of coils for MST or NFC are mounted, the FPCB 715 may be configured with a 1-layer and a 2-layer. According to an embodiment, at least some of the coil mounted in each of the 1-layer and 2-layer may be electrically connected through a conductive via that connects the 1-layer and 2-layer. According to an embodiment, the 1-layer may include a voltage detection coil, NFC antenna 1220, first and second loop antennas 1212 and 1214 for MST payment, or temperature measurement element (e.g., thermistor). The voltage detection coil may measure a temperature of the electronic device 1200 through, for example, the temperature measurement element or may detect a magnetic field at a periphery of the electronic device 1200. For example, when the electronic device 1200 activates NFC communication (e.g., NFC payment), the NFC antenna 1220 may generate a magnetic field corresponding to an NFC method and detect a magnetic field corresponding to the NFC method at a periphery of the electronic device. For example, when the electronic device 1200 activates MST payment, the first and second loop antennas 1212 and 1214 for MST payment may generate a magnetic field corresponding to an MST payment method. According to an embodiment, the 2-layer may include the NFC antenna 1220 or a wireless charging coil. The NFC antenna 1220 may be mounted in, for example, each of the 1-layer and 2-layer of the FPCB 715. The wireless charging coil may be disposed to charge, for example, the battery (e.g., battery 707) of the electronic device 1200 by wireless.

Figure 13B:
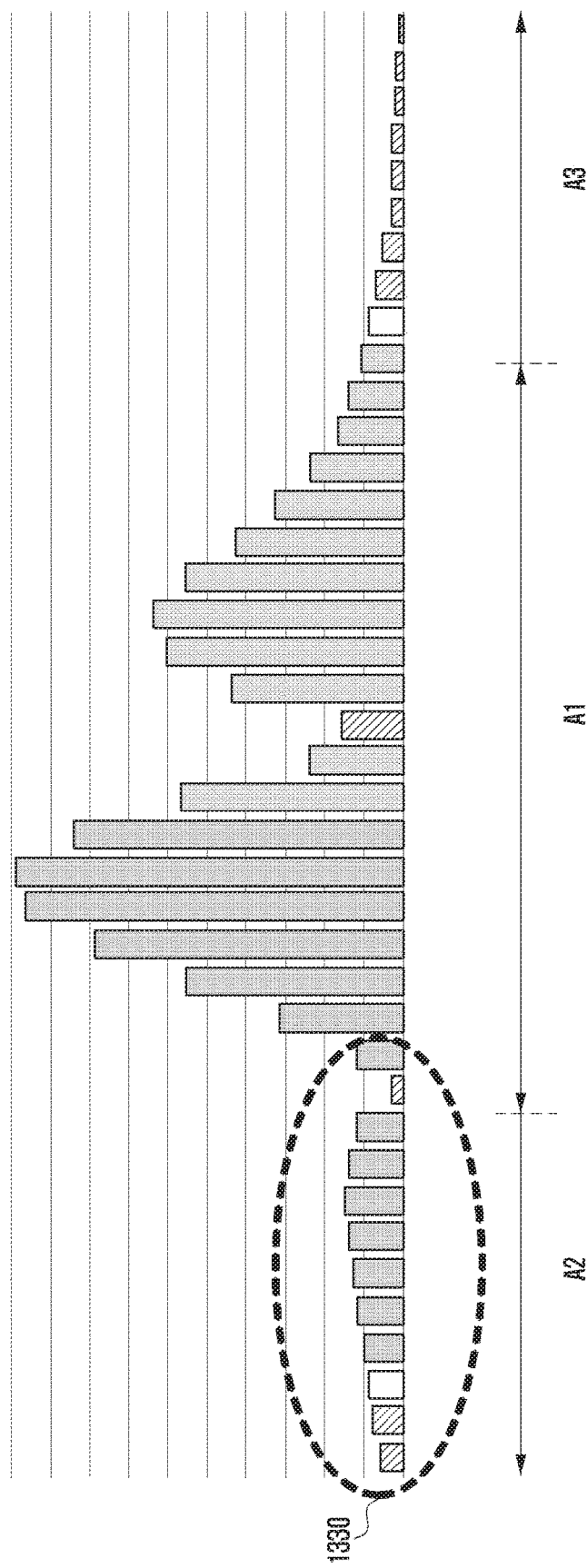

FIGS. 13A and 13B are diagrams illustrating a magnetic field generated in an MST module having two loop antennas according to an embodiment of the disclosure. FIG. 13A is a diagram illustrating a magnetic flux generated in an MST module having two loop antennas according to an embodiment of the disclosure. FIG. 13B is a graph measuring intensity of a magnetic field generated in an MST module having two loop antennas according to an embodiment of the disclosure. According to an embodiment, a cross section of the MST module of FIGS. 12A and 12B may be the same as or similar to that of FIG. 13A.

Referring to FIG. 13A, the first loop antenna 1212 and the second loop antenna 1214 each may be configured with a flat type coil. For example, the first loop antenna 1212 may be configured with a conductive coil wound in a spiral shape about a Z-axis perpendicular to a rear surface (XY plane) of the electronic device, and the second loop antenna 1214 may be configured with a conductive coil wound in a spiral shape about another Z-axis perpendicular to a rear surface (XY plane) of the electronic device 1200.

According to an embodiment, the first loop antenna 1212 and the second loop antenna 1214 may form a magnetic field (or magnetic wave) 1322 formed in a direction of a Z-axis perpendicular to a rear surface (XY plane) of the electronic device 1200 and a magnetic field 1324 formed in a direction parallel to a rear surface (XY plane) of the electronic device 1200, respectively. For example, a first magnetic flux 1312 generated in the first loop antenna 1212 may be emitted in a direction of a Z-axis, and a second magnetic flux 1314 generated in the second loop antenna 1214 may be emitted in a direction of a Y-axis (e.g., a longitudinal direction of the electronic device when viewed from a rear surface of the electronic device) parallel to a rear surface (XY plane) of the electronic device.

According to an embodiment, a portion of the magnetic field 1322 generated in the first loop antenna 1212 or the second loop antenna 1214 may be prevented from being spread to a lower portion by the first shielding member 1242.

According to an embodiment, in a portion in which one side area of the second shielding member 1244 and one side area of the first shielding member 1242 are overlapped with each other, because the second loop antenna 1214 is positioned between the first shielding member 1242 and the second shielding member 1244, a portion of the magnetic field 1322 generated in the second loop antenna 1214 may be formed at the upper end portion A2 of the electronic device 1200 in which the camera 1230 is positioned similar to a solenoid type coil. For example, the first shielding member 1242 may be positioned at a lower portion of the first and second loop antennas 1212 and 1214 and include a first portion 1242a positioned to correspond to the first loop antenna 1212 or a second portion 1242b connected to the first portion 1242a and positioned to correspond to a portion of the second loop antenna 1214. The second shielding member 1244 may include a third portion 1244a positioned at an upper portion of the second loop antenna 1214 and overlapped with the second portion 1242b of the first shielding member 1242, a fourth portion 1244b overlapped with a portion of the second loop antenna 1214, or a fifth portion 1244c extended from the fourth portion 1244b to an area between the second loop antenna 1214 and the camera 1230. According to an embodiment, the second shielding member 1244 may further include another portion (not shown) directly connected to one side area of the first shielding member 1242 through a central portion of the second loop antenna 1214.

Referring to FIGS. 13A and 13B, the electronic device (e.g., electronic device 1200) according to an embodiment of the disclosure may have two loop antennas for performing a payment function using MST and position two loop antennas at a central portion A1 of the electronic device 1200 and a portion, respectively, between the central portion A1 and the camera 1230 positioned at one side of the electronic device (e.g., electronic device 1200) to enlarge distribution of a magnetic field generated in the loop antenna.

According to an embodiment of the disclosure, by removing a loop antenna positioned at an upper end portion A2 of the electronic device 1200, performance degradation due to mutual interference between a loop antenna and other antennas (LTE, GPS, or WI-FI) positioned at a periphery of the camera 1230 can be prevented and negative design factors such as mechanical design restriction or mechanical rigidity weakening can be prevented. According to an embodiment of the disclosure, a portion of an antenna (e.g., second loop antenna 1214) for MST configured with a plane type coil may be positioned between the first loop antenna 1212 (e.g., at least one loop antenna 717) and the camera 1230 positioned at one side of the electronic device (e.g., electronic device 1200), and in a portion in which one side area of the second shielding member 1244 and one side area of the first shielding member 1242 are overlapped, and by enabling the portion of the antenna to be positioned between the first shielding member 1242 and the second shielding member 1244, even in the upper end portion A2 of the electronic device 1200, an emission performance can be ensured; thus, reliability of payment using MST can be enhanced. For example, as indicated by identification number 1330 of FIG. 13B, a radiation performance of the loop antenna can be secured in the upper end portion A2 of the electronic device 1200 as well as the central portion A1 of the electronic device 1200.

Figure 14A:
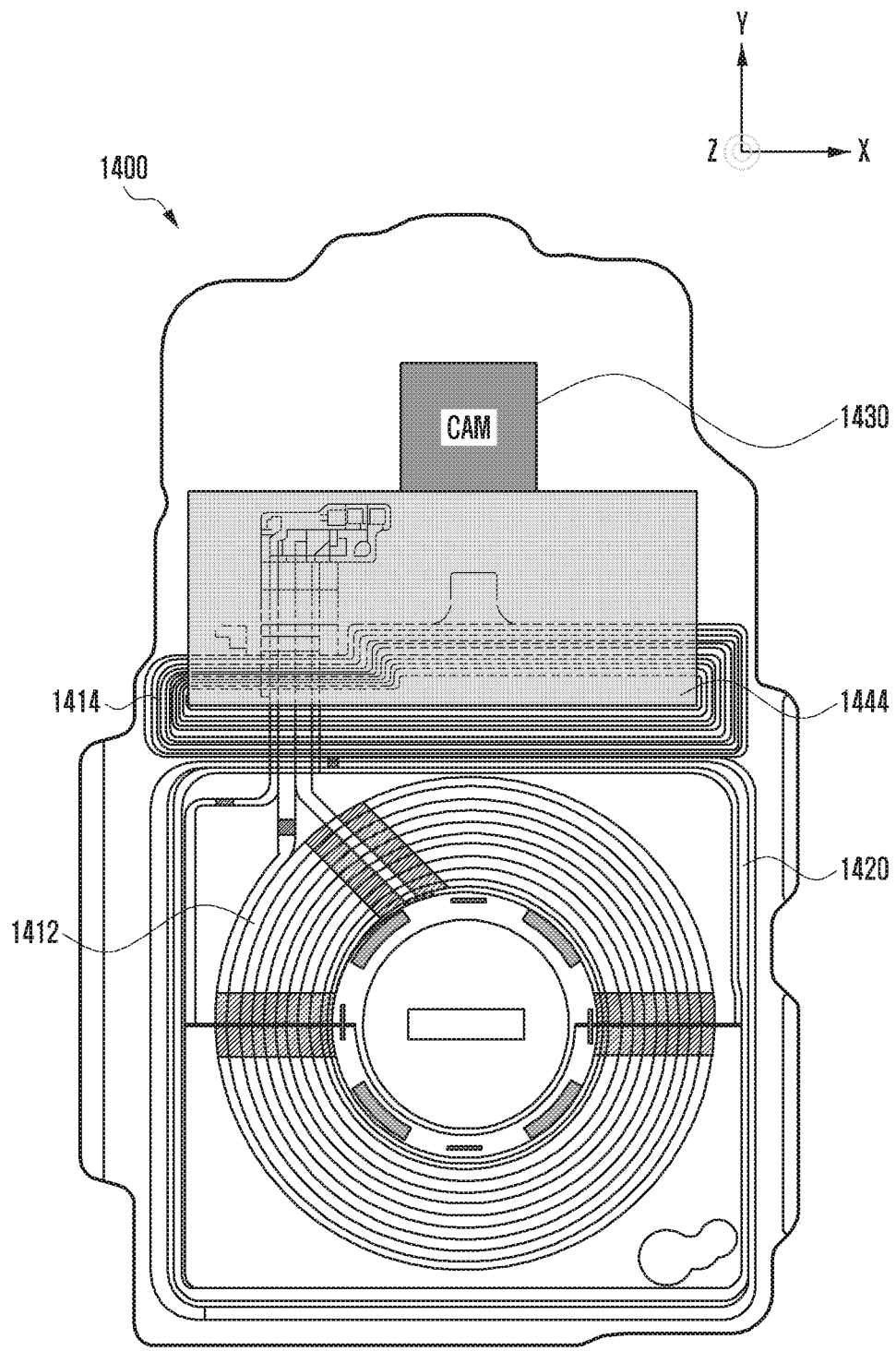
FIGS. 14A and 14B are front views illustrating an MST module having two loop antennas according to an embodiment of the disclosure.
Figure 14B:
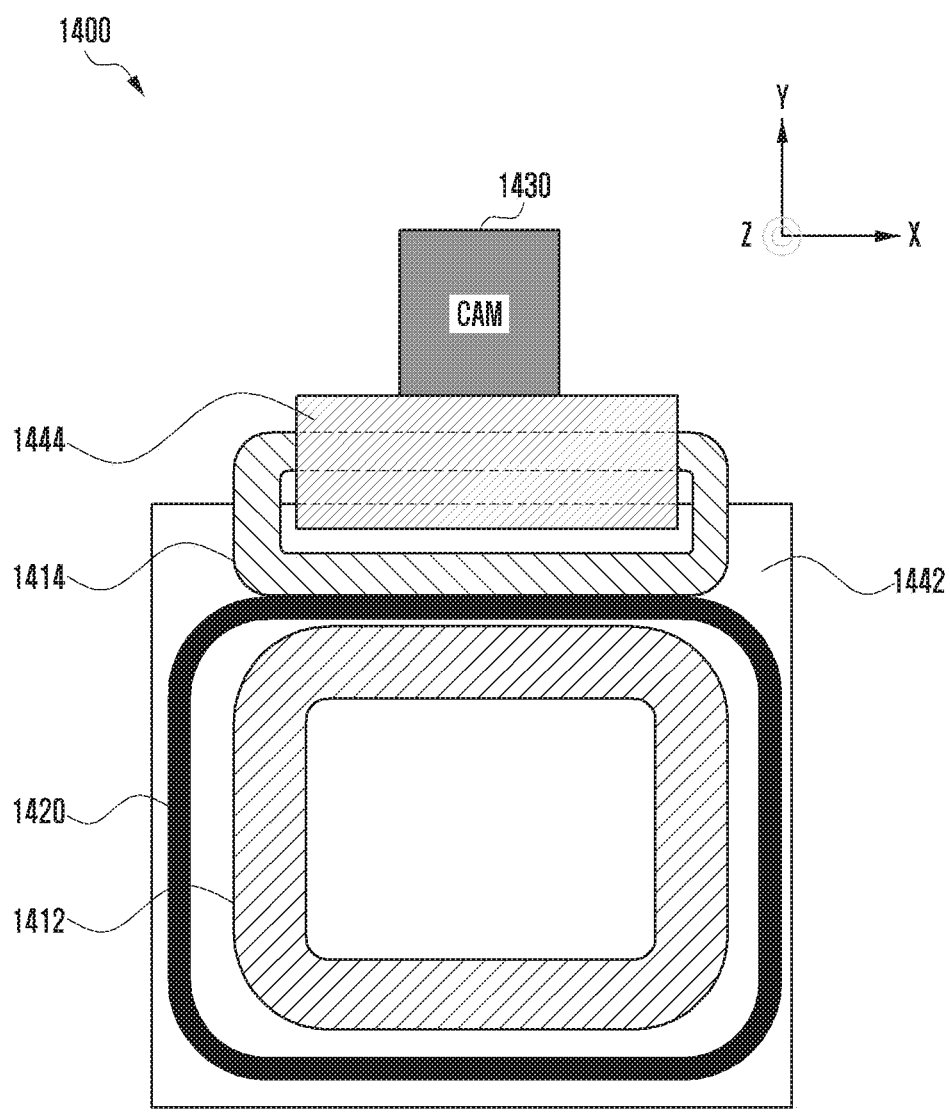

FIGS. 14A and 14B are front views illustrating an MST module having two loop antennas according to another embodiment of the disclosure. FIG. 14A is a view illustrating in a layout form an FPCB in which a loop antenna for MST is mounted according to another embodiment of the disclosure. FIG. 14B is a view illustrating a layout of an FPCB in which a loop antenna for MST is mounted according to another embodiment of the disclosure.

Referring to FIGS. 14A and 14B, an MST module according to another embodiment of the disclosure may include a first loop antenna 1412, second loop antenna 1414, first shielding member 1442, or second shielding member 1444.

The first loop antenna 1412 may be positioned, for example, at a central portion of an electronic device 1400 (e.g., electronic device 700). According to an embodiment, when viewed (XY plane) from a rear surface of the electronic device 1400, the first loop antenna 1412 may be positioned at a central portion of the electronic device 1400 and be configured with a conductive coil having a plurality of turns. For example, the first loop antenna 1412 may be mounted in an FPCB (e.g., FPCB 715) attached to a lower surface of a cover (e.g., cover 709) positioned at a rear surface of the electronic device 1400 and be positioned to correspond to a central portion of the electronic device 1400. According to an embodiment, the first loop antenna 1412 may be configured with a flat type coil wound in a spiral shape about a Z-axis perpendicular to a rear surface (XY plane) of the electronic device 1400.

The second loop antenna 1414 may be spaced apart, for example, the first loop antenna 1412, be positioned between the first loop antenna 1412 and a camera 1430 (e.g., camera 703) positioned at one side of the electronic device (e.g., electronic device 1400), and be configured with a conductive coil having a plurality of turns. For example, the second loop antenna 1414 may be mounted in the FPCB 715 attached to a lower surface of the cover 709 positioned at the rear surface of the electronic device 1400 and be positioned to correspond between the camera 1430 and the first loop antenna 1412. According to an embodiment, the second loop antenna 1414 may be configured with a flat type coil wound in a spiral shape about a Z-axis perpendicular to a rear surface (XY plane) of the electronic device 1400.

The first shielding member 1442 may be positioned, for example, at a lower portion of the first loop antenna 1412 and the second loop antenna 1414. According to an embodiment, the first shielding member 1442 may operate as a core for increasing a magnetic force generated in the first loop antenna 1412 or the second loop antenna 1414. For example, a magnetic flux generated in the first loop antenna 1412 or the second loop antenna 1414 may be spread to a peripheral area of the first loop antenna 1412 or the second loop antenna 1414 via the first shielding member 1442 and be emitted to the outside through a portion of the cover 709.

The second shielding member 1444 may be positioned, for example, at an upper portion of the second loop antenna 1414 and be positioned to extend to a portion close to the camera 1430. According to an embodiment, the second shielding member 1444 may operate as a core for increasing the magnetic force generated in the second loop antenna 1414. For example, a magnetic flux generated in the second loop antenna 1414 may be spread to a peripheral area of the second loop antenna 1414 via the second shielding member 1444 and be emitted to the outside through a portion of the cover 709. For example, a magnetic flux generated in the second loop antenna 1414 may be spread to an upper end portion of the electronic device 1400 in which the camera 1430 is positioned via the second shielding member 1444.

According to an embodiment, at least some of the second shielding member 1444 may be overlapped with the first shielding member 1442; thus, the second loop antenna 1414 may be from the magnetic field (or magnetic wave) 920 in a direction horizontal to a rear surface (XY plane) of the electronic device 1400. For example, because a portion of the second shielding member 1444 is overlapped with the first shielding member 1442, a direction of a magnetic flux emitted from the second loop antenna 1414 configured with a flat type coil may be induced in a direction horizontal to the rear surface (XY plane) of the electronic device 1400. For example, although the second loop antenna 1414 is configured with a flat type coil, in a portion in which one side area of the second shielding member 1444 and one side area of the first shielding member 1442 are overlapped, the second loop antenna 1414 is positioned between the first shielding member 1442 and the second shielding member 1444 to form a magnetic field of a form similar to that of the solenoid type coil. In the foregoing description, a magnetic field of a form similar to that of the solenoid type coil may mean, for example, a magnetic field emitted in a direction horizontal to the rear surface (XY plane) of the electronic device 1400 from the second loop antenna 1414. For example, a magnetic field of a form similar to that of the solenoid type coil may mean a magnetic field emitted to an upper end portion of the electronic device 1400 in which the camera 1430 is positioned.

According to some embodiments, at least some of the second shielding member 1444 may be directly connected to a portion of the first shielding member 1442.

According to an embodiment, the second shielding member 1444 and the first shielding member 1442 may be formed in one piece.

According to an embodiment, the first and second shielding members 1442 and 1444 each may include a plane substantially parallel to the cover (e.g., cover 709) positioned at a rear surface of the electronic device 1400.

According to an embodiment, the first and second shielding members 1442 and 1444 each may include a plate made of a magnetic material.

According to an embodiment, at an outer portion of the first loop antenna 1412, an NFC antenna 1420 may be positioned. The NFC antenna 1420 may be mounted in the FPCB 715 attached to a lower surface of the cover (e.g., cover 709) positioned, for example, at a rear surface of the electronic device 1400 and be configured with a conductive coil. For example, when viewed from a rear surface (XY plane) of the electronic device 1400, the NFC antenna 1420 may be positioned to enclose an outer portion of the first loop antenna 1412 and be configured with a conductive coil having at least one turn. According to an embodiment, a portion of the NFC antenna 1420 may be overlapped with a portion of the second loop antenna 1414.

Unlike the MST module of FIG. 12, in the MST module according to another embodiment of the disclosure, the second shielding member 1444 may be extended to a portion close to the camera 1430. According to another embodiment of the disclosure, because the second shielding member 1444 is extended to a portion close to the camera 1430, a magnetic flux generated in the second loop antenna 1414 may be well spread to the upper end portion A1 of the electronic device 1400 adjacent to the camera 1430; therefore, in the upper end portion A1 of the electronic device 1400, a radiation performance of a loop antenna for MST can be further improved.

Figure 15A:
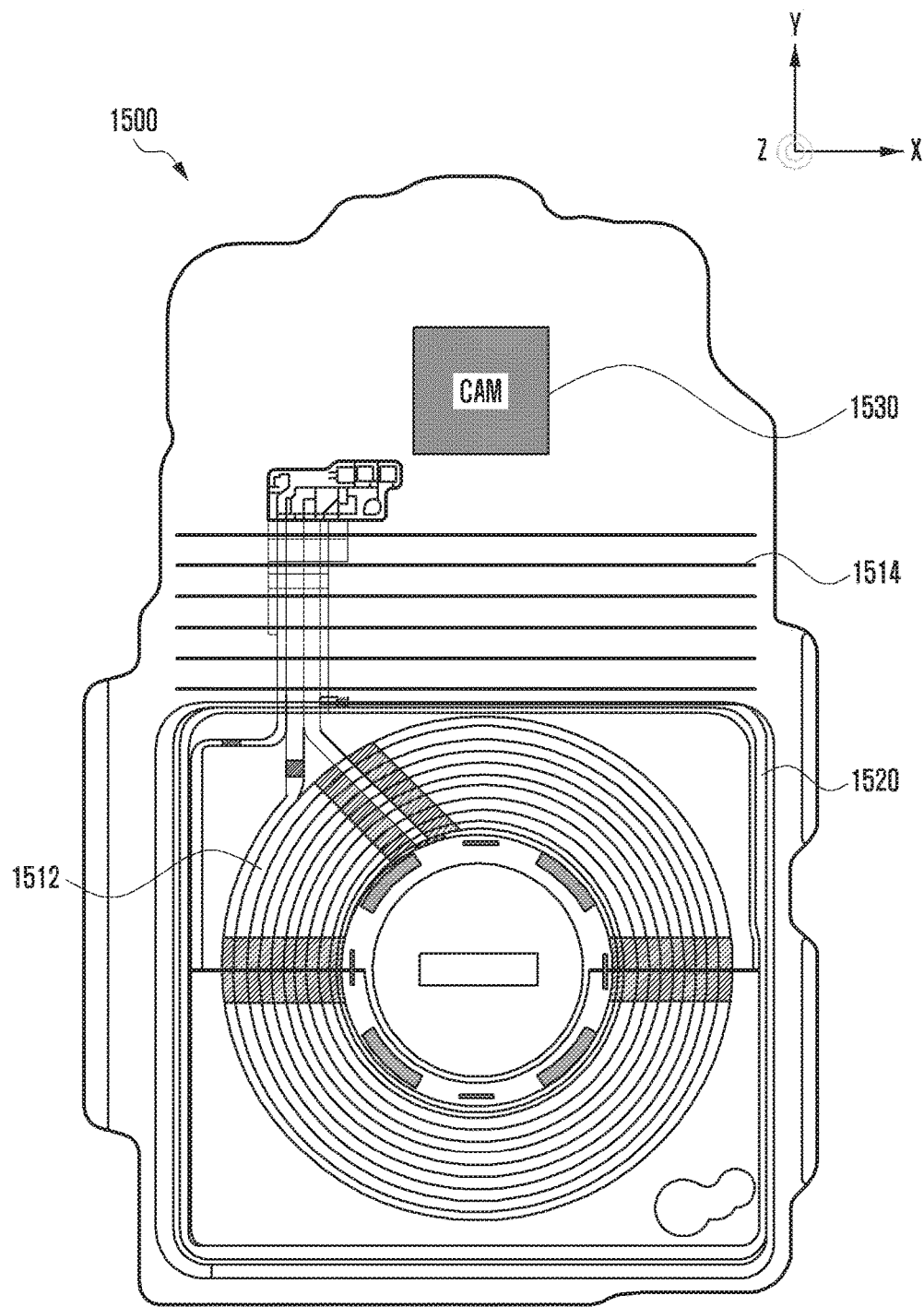
FIGS. 15A and 15B are front views illustrating an MST module having two loop antennas according to an embodiment of the disclosure.
Figure 15B:
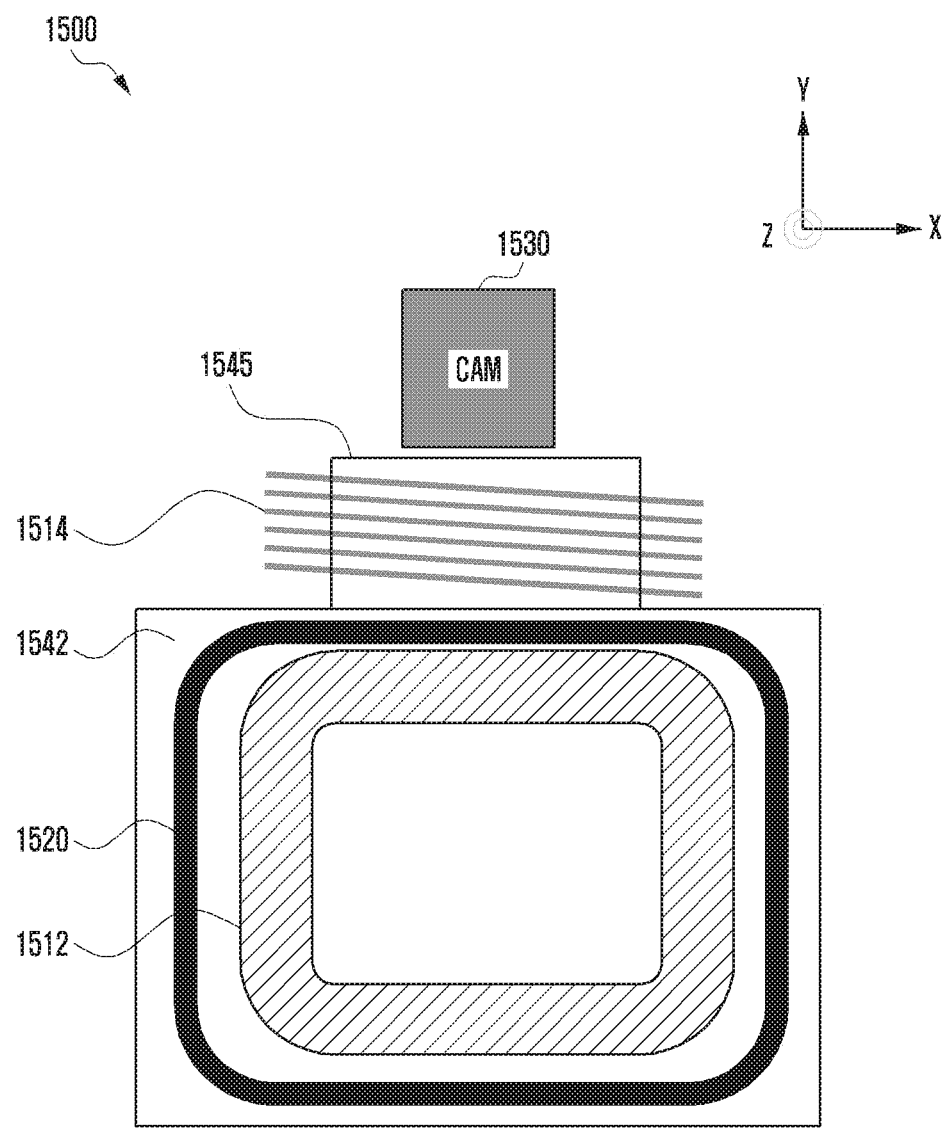

FIGS. 15A and 15B are front views illustrating an MST module having two loop antennas according to another embodiment of the disclosure. FIG. 15A is a view illustrating in a layout form an FPCB in which a loop antenna for MST is mounted according to an embodiment of the disclosure. FIG. 15B is a view illustrating in a layout form an FPCB in which a loop antenna for MST is mounted according to another embodiment of the disclosure.

Referring to FIGS. 15A and 15B, an MST module according to another embodiment of the disclosure may include a first loop antenna 1512, a second loop antenna 1514, an NFC antenna 1520, and shielding members 1542 and 1545.

The first loop antenna 1512 may be positioned, for example, at the center of an electronic device 1500 (e.g., the electronic device 700). According to an embodiment, when viewed from a rear surface (XY plane) of the electronic device 1500, the first loop antenna 1512 may be positioned at a central portion of the electronic device 1500 and be configured with a conductive coil having a plurality of turns. For example, the first loop antenna 1512 may be mounted in the FPCB (e.g., FPCB 715) attached to a lower surface of a cover (e.g., cover 709) positioned at the rear surface of the electronic device 1500 and be positioned to correspond to a central portion of the electronic device 1500. According to an embodiment, the first loop antenna 1512 may be configured with a flat type coil wound in a spiral shape about a Z-axis perpendicular to a rear surface (XY plane) of the electronic device 1500.

The second loop antenna 1514 may be spaced apart from, for example, the first loop antenna 1512, be positioned between the first loop antenna 1512 and a camera 1530 (e.g., camera 703) positioned at one side of the electronic device (e.g., 1500), and be configured with a conductive coil having a plurality of turns. For example, the second loop antenna 1514 may be mounted in the FPCB 715 attached to a lower surface of the cover 709 positioned at the rear surface of the electronic device 1500 and positioned to correspond between the camera 1530 and the first loop antenna 1512. According to an embodiment, the second loop antenna 1514 may be configured with a solenoid type coil wound several times in a direction of a Y-axis (a longitudinal direction when viewed from the rear surface of the electronic device 1500) parallel to the rear surface (XY plane) of the electronic device 1500.

The shield members 1542 and 1545 may be formed, for example, in one piece. According to an embodiment, the shielding members 1542 and 1545 may include a sixth portion 1543 or a seventh portion 1544.

The sixth portion 1543 of the shielding members 1542 and 1545 may be positioned, for example, at a lower portion of the first loop antenna 1512 and the second loop antenna 1514. According to an embodiment, the sixth portion 1543 may operate as a core for increasing a magnetic force generated in the first loop antenna 1512. For example, the magnetic flux generated in the first loop antenna 1512 may be spread to a peripheral area of the first loop antenna 1512 or the second loop antenna 1514 via the sixth portion 1543 or may be emitted to the outside through a portion of the cover 709.

The seventh portion 1544 of the shielding members 1542 and 1545 may be positioned to penetrate through, for example, the center of the second loop antenna 1514. According to an embodiment, the seventh portion 1544 may operate as a core for increasing a magnetic force generated in the second loop antenna 1514. For example, the magnetic flux generated in the second loop antenna 1514 may be spread to a peripheral area of the second loop antenna 1514 via the seventh portion 1544 of the shielding members 1542 and 1545 and be emitted to the outside through a portion of the cover 709. For example, the magnetic flux generated in the second loop antenna 1514 may be spread to the upper end portion A1 of the electronic device 1500 in which the camera 1530 is positioned via the seventh portion 1544.

According to an embodiment, the shielding members 1542 and 1545 may include a plane substantially parallel to a cover (e.g., cover 709) positioned at the rear surface of the electronic device 1500.

According to an embodiment, the shielding members 1542 and 1545 may include a plate made of a magnetic material.

According to an embodiment, at least some of each of the sixth portion 1543 and the seventh portion 1544 of the shielding members 1542 and 1545 may be connected to each other. For example, one side area of the sixth portion 1543 and one side area of the seventh portion 1544 may be directly connected to each other.

Figure 16A:
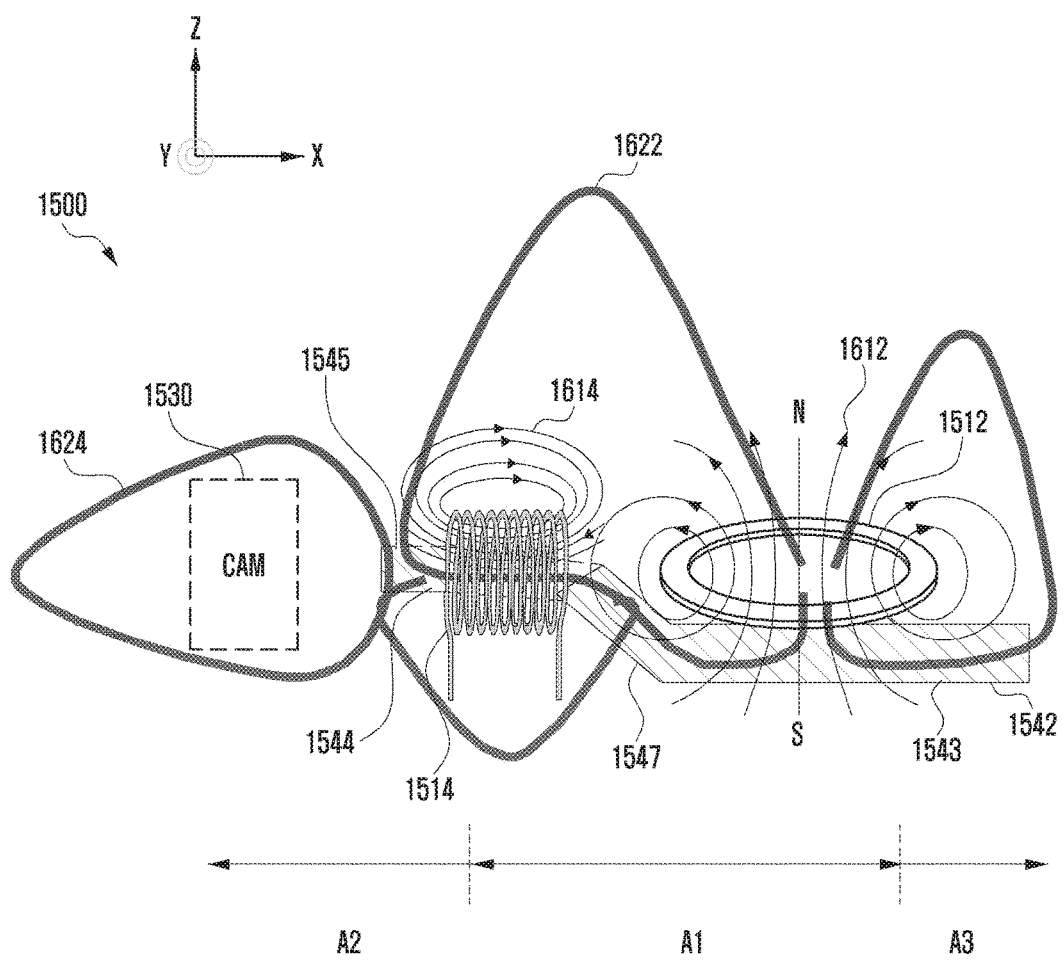
Figure 17:
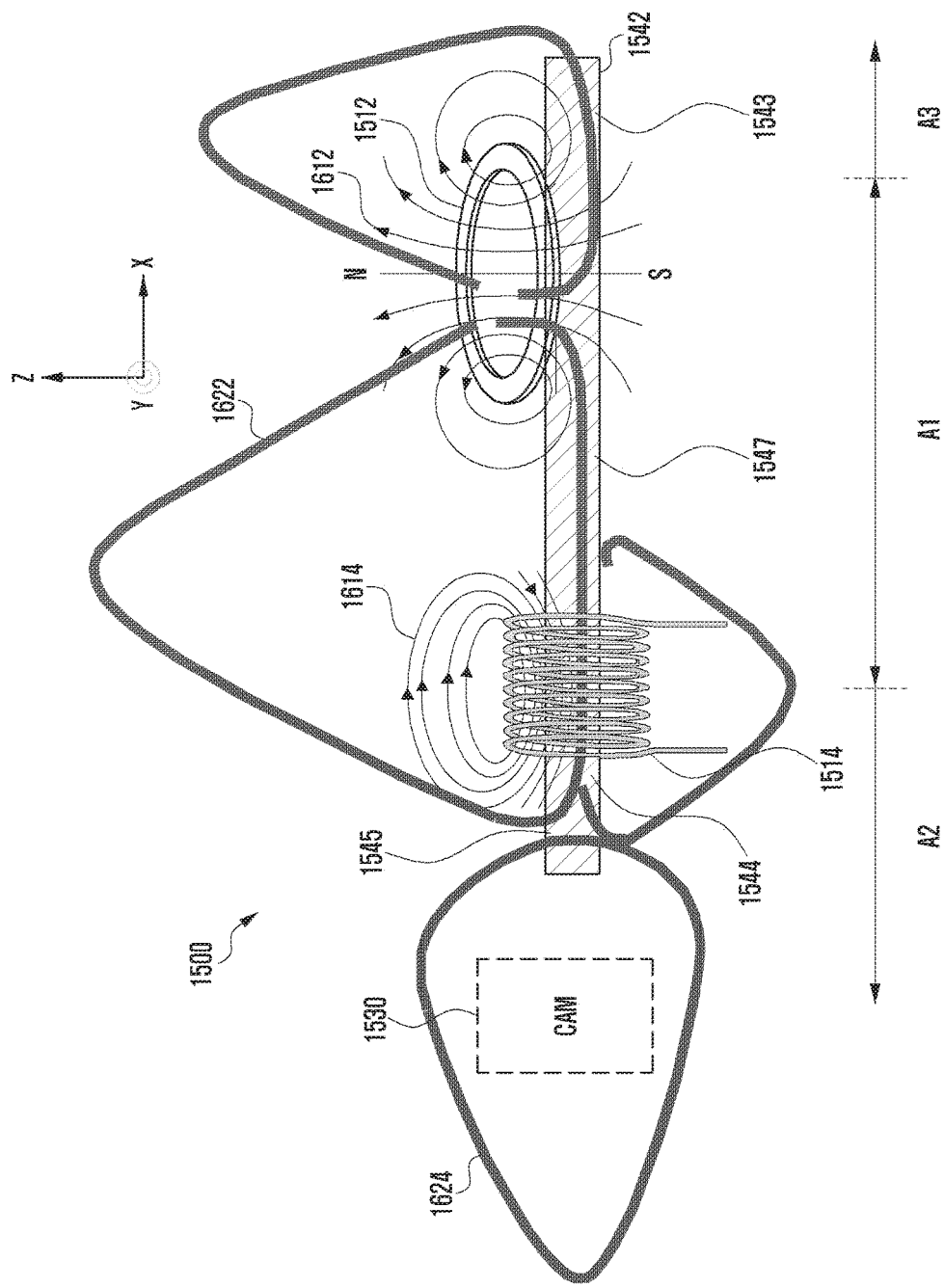
FIG. 17 is a cross-sectional view illustrating an MST module having two loop antennas according to an embodiment of the disclosure.

FIGS. 16A and 16B are diagrams illustrating a magnetic field generated in an MST module having two loop antennas according to another embodiment of the disclosure. FIG. 17 is a cross-sectional view illustrating an MST module having two loop antennas according to another embodiment. FIG. 16A is a diagram illustrating a magnetic flux generated in an MST module having two loop antennas according to another embodiment of the disclosure. FIG. 16B is a graph measuring intensity of a magnetic field generated in an MST module having two loop antennas according to another embodiment of the disclosure. According to an embodiment, a cross section of the MST module of FIGS. 15A and 15B may be the same as or similar to that of FIG. 16A.

Referring to FIGS. 16A and 17, the first loop antenna 1512 may be configured with a flat type coil, and the second loop antenna 1514 may be configured with a solenoid type coil. For example, the first loop antenna 1512 may be configured with a conductive coil wound in a spiral shape about a Z-axis perpendicular to a rear surface (XY plane) of the electronic device (e.g., electronic device 1500), and the second loop antenna 1514 may be configured with a conductive coil wound in a direction of a Y-axis horizontal to a rear surface (XY plane) of the electronic device 1500. For example, the second loop antenna 1514 may be configured with a coil wound in a Y-axis direction based on the seventh portion 1544 of the shielding members 1542 and 1545.

According to an embodiment, the sixth portion 1543 and the seventh portion 1544 of the shielding members 1542 and 1545 may be formed in different layers. For example, the seventh portion 1544 of the shielding members 1542 and 1545 to be the center of a winding direction of the second loop antenna 1514 may be positioned at the same layer as that of the first loop antenna 1512; therefore, the seventh portion 1544 may be positioned at a relatively higher layer than that of the sixth portion 1543. According to an embodiment, the shielding members 1542 and 1545 may further include an eighth portion 1547 that connects one side portion of the sixth portion 1543 and one side portion of the seventh portion 1544 in an area between the first and second loop antennas 1514 and 1514. According to some embodiments, the sixth portion to eighth portions 1543, 1544, and 1547 of the shielding members 1542 and 1545 may be physically connected to each other to be integrally formed. According to another embodiment, as shown in FIG. 17, all of the sixth portion to the eighth portions 1543, 1544, and 1547 of the shielding members 1542 and 1545 may be positioned at the same layer.

According to an embodiment, each of the first loop antenna 1512 and the second loop antenna 1514 may form a magnetic field (or magnetic wave) 1622 formed in a Z-axis direction perpendicular to the rear surface (XY plane) of the electronic device 1500 and a magnetic field 1624 formed in a direction parallel to a rear surface (XY plane) of the electronic device 1500. For example, a first magnetic flux 1612 generated in the first loop antenna 1512 may be emitted in the Z-axis direction, and a second magnetic flux 1614 generated in the second loop antenna 1514 may be emitted in a Y-axis direction (e.g., a longitudinal direction of the electronic device when viewed from a rear surface of the electronic device) parallel to a rear surface (XY plane) of the electronic device 1500.

According to an embodiment, a portion of the magnetic fields 1622 and 1624 generated in the first loop antenna 1512 or the second loop antenna 1514 may be shielded from being spread to a lower portion by the sixth portion 1543 of the shielding members 1542 and 1545.

Referring to FIGS. 16A and 16B, the electronic device (e.g., electronic device 1500) according to another embodiment of the disclosure may have two loop antennas for performing a payment function using MST, and the two loop antennas are positioned at a central portion A1 of the electronic device (e.g., electronic device 1500) and a portion between the central portion A1 and the camera 1530 positioned at one side of the electronic device (e.g., electronic device 1500), respectively, to enlarge distribution of a magnetic field generated in the loop antenna. According to another embodiment of the disclosure, by removing the second loop antenna 1514 positioned at an upper end portion A2 of the electronic device 1500, performance degradation due to mutual interference between the loop antenna and other antennas (LTE, GPS, or WI-FI) positioned at a periphery of the camera 1530 can be prevented and negative design factors such as mechanical design restriction or mechanical rigidity weakening can be prevented. According to another embodiment of the disclosure, a portion of the antenna for MST may be positioned between the camera 1530 (e.g., camera 703) positioned at one side of the electronic device (e.g., electronic device 1500) and the first loop antenna 1212, and be configured with a solenoid type coil wound in a Y-axis direction parallel to the rear surface (XY plane) of the electronic device 1500; thus, even in an upper end portion A2 of the electronic device 1500, an emission performance can be ensured; therefore, reliability of payment using MST can be enhanced. For example, as indicated by identification number 1630 of FIG. 16B, a radiation performance of the loop antenna can be secured in the upper end portion A2 of the electronic device 1500 as well as the central portion A1 of the electronic device 1500.

Figure 18:
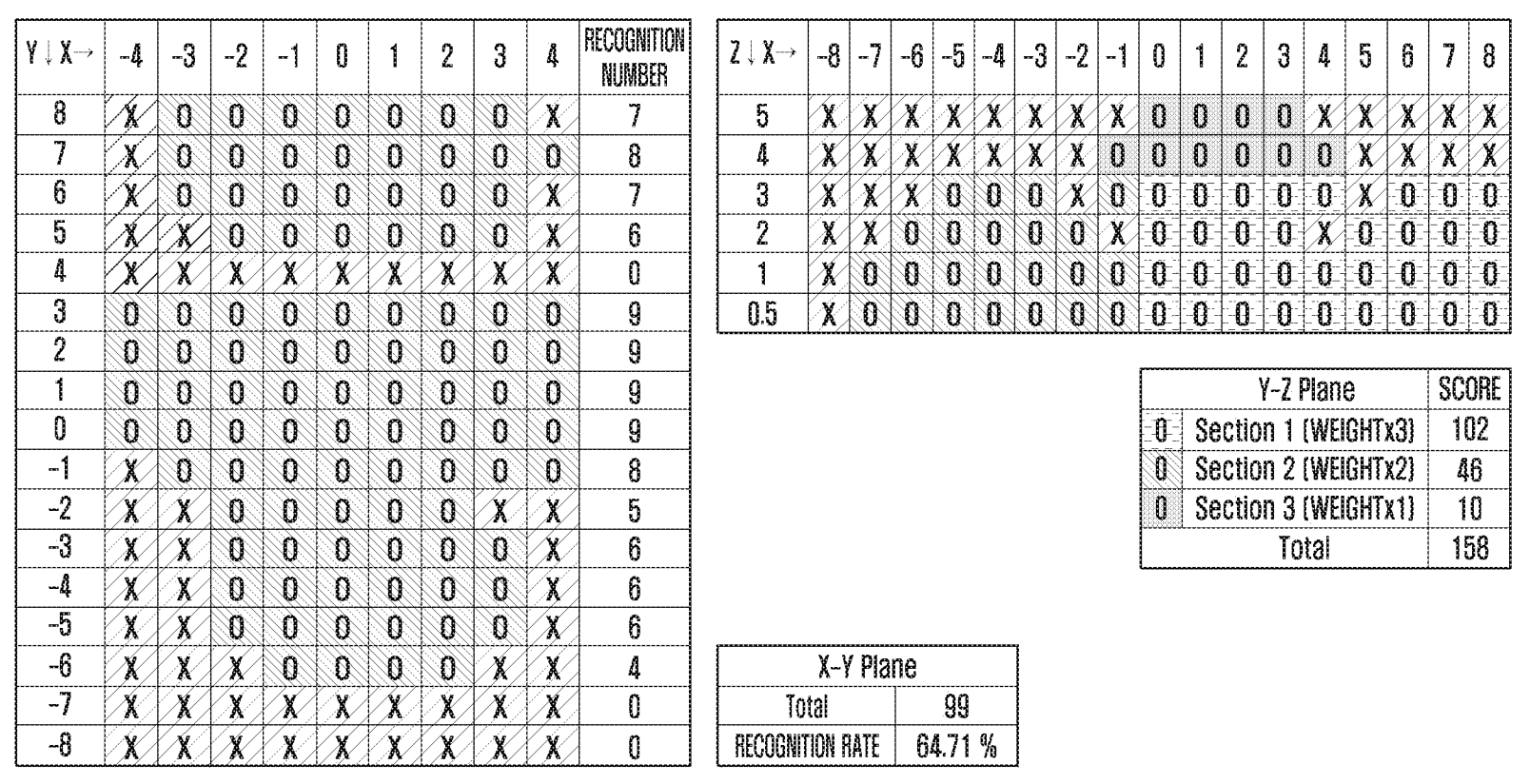

FIG. 18 is a table illustrating scores of test results of radiation efficiency based on an antenna structure of an electronic device according to an embodiment of the disclosure. FIG. 19 is a table illustrating scores of test results of radiation efficiency based on an antenna structure of an electronic device according to another embodiment of the disclosure.

Referring to FIG. 18, in the electronic device of FIGS. 8 and 9, a measurement score of radiation efficiency of a loop antenna for MST is 158 and a recognition rate thereof is 64.71%.

Referring to FIG. 19, in the electronic device of FIGS. 12 and 13, a measurement score of radiation efficiency of a loop antenna for MST is 155 and a recognition rate thereof is 63.40%.

When comparing a performance test, in the electronic device according to an embodiment of the disclosure described with reference to FIGS. 12 and 13, by removing the second loop antenna 1214 positioned at the upper end portion A2 of the electronic device 1200, performance degradation due to mutual interference between the loop antenna and other antennas (LTE, GPS, or WI-FI) positioned at a periphery of the camera 1030 can be prevented, and by ensuring an emission performance in the upper end portion A2 of the electronic device 1200 while preventing negative design factors such as mechanical design restriction or mechanical rigidity weakening, radiation efficiency and a recognition rate of the same level as that of the electronic device 700 of FIGS. 8 and 9 can be provided.

As described above, according to various embodiments of the disclosure, a radiation performance of a loop antenna for MST can be enhanced, performance degradation due to mutual interference between a loop antenna for MST and other antennas (LTE, GPS, or WI-FI) positioned at a periphery of a camera can be prevented, and negative design factors such as mechanical design restriction or mechanical rigidity weakening can be prevented.

A programming module according to embodiments of the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Further, some operations may be executed according to another order or may be omitted, or other operations may be added.

The above-described embodiments of the disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., random access memory (RAM), read only memory (ROM), Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
    a housing comprising:
        a first surface facing a first direction,
        a second surface facing a second direction opposite to the first direction, and
        a side member configured to enclose at least some of a space between the first surface and the second surface;
    a first conductive coil positioned inside the housing and configured to form a first magnetic field in a direction substantially perpendicular to the first direction or the second direction;
    a second conductive coil spaced apart from the first conductive coil within the housing and configured to form a second magnetic field in a direction substantially parallel to the first direction or the second direction;
    a communication circuit positioned inside the housing and electrically connected to the first and second conductive coils; and
    a processor positioned inside the housing and electrically connected to the communication circuit.

2. The electronic device of claim 1, further comprising:
    a first shielding member comprising:
        a first portion positioned at a lower portion of the first and second conductive coils and overlapped with the first conductive coil, and
        a second portion connected to the first portion and overlapped with a portion of the second conductive coil; and
    a second shielding member comprising a third portion positioned at an upper portion of the second conductive coil and overlapped with the second portion of the first shielding member,
    wherein the first and second conductive coils comprise coils wound in a spiral shape about each of different shafts in parallel to the first direction or the second direction.

3. The electronic device of claim 2, further comprising:
    a component positioned inside the housing and positioned adjacent to one side of the second surface,
    wherein the second conductive coil is positioned between the component and the first conductive coil when viewed from above the second surface.

4. The electronic device of claim 3, wherein the second shielding member comprises the third portion overlapped with the second portion of the first shielding member, a fourth portion overlapped with a portion of the second conductive coil, and a fifth portion extended from the fourth portion to an area between the second conductive coil and the component.

5. The electronic device of claim 4, wherein the second shielding member further comprises another portion directly connected to the second portion of the first shielding member through a central portion of the second conductive coil.

6. The electronic device of claim 4, wherein the second shielding member further comprises another portion extended from a portion overlapped with the second conductive coil to a portion adjacent to the component when viewed from above the second surface.

7. The electronic device of claim 2, wherein the first and second shielding members comprise a plane substantially parallel to the first surface or the second surface and a plate formed with a magnetic material.

8. The electronic device of claim 3, wherein the component comprises a camera.

9. The electronic device of claim 2, further comprising:
    a flexible printed circuit board (FPCB),
    wherein the first and second conductive coils are mounted in the FPCB.

10. The electronic device of claim 1, further comprising:
    a shielding member,
    wherein the shielding member comprises:
        a sixth portion positioned at a lower portion of the first conductive coil;

a seventh portion spaced apart from a first shielding member; and an eighth portion that connects the sixth portion and the seventh portion, wherein the second conductive coil is formed with a solenoid type coil that winds the seventh portion of the shielding member about a shaft perpendicular to the first direction or the second direction, and wherein the first conductive coil is formed with a flat type coil wound about a shaft parallel to the first direction or the second direction.

11. The electronic device of claim 10, further comprising:

a component positioned inside the housing and positioned adjacent to one side of the second surface, wherein the second conductive coil is positioned between the component and the first conductive coil when viewed from above the second surface.

12. The electronic device of claim 10, wherein the seventh portion of the shielding member is formed in a different layer from that of the sixth portion of the shielding member.

13. The electronic device of claim 10, wherein the seventh portion of the shielding member is formed in a same layer as that of the sixth portion of the shielding member.

14. The electronic device of claim 10, wherein the seventh portion of the shielding member comprises a portion extended to an area adjacent to a component positioned inside the housing adjacent to one side of the second surface.

15. The electronic device of claim 10, wherein the shielding member comprises a plane substantially parallel to the first surface or the second surface and a plate formed with a magnetic material.

16. The electronic device of claim 12, further comprising:

a flexible printed circuit board (FPCB), wherein the first and second conductive coils are mounted in the FPCB.

17. An electronic device, comprising:

a housing comprising:

a first surface facing a first direction, a second surface facing a second direction opposite to the first direction, and a side member configured to enclose at least some of a space between the first surface and the second surface;

a component positioned inside the housing adjacent to one side of the second surface;

a first conductive coil positioned inside the housing and configured to form a first magnetic field in a direction substantially perpendicular to the first direction or the second direction;

a second conductive coil positioned inside the housing between the component and the first conductive coil when viewed from above the second surface and configured to form a second magnetic field in a direction substantially parallel to the first direction or the second direction;

a communication circuit positioned inside the housing and electrically connected to the first and second conductive coils; and a processor positioned inside the housing and electrically connected to the communication circuit.

18. The electronic device of claim 17, further comprising:

a first shielding member comprising:

a first portion positioned at a lower portion of the first and second conductive coils and overlapped with the first conductive coil, and a second portion connected to the first portion and overlapped with a portion of the second conductive coil; and a second shielding member comprising a portion positioned at an upper portion of the second conductive coil and overlapped with the second portion of the first shielding member, wherein the first and second conductive coils comprise coils wound in a spiral shape about each of different shafts in parallel to the first direction or the second direction.

19. The electronic device of claim 17, further comprising:

a shielding member, wherein the shielding member comprises:

a sixth portion positioned at a lower portion of the first conductive coil, a seventh portion spaced apart from a first shielding member, and an eighth portion configured to connect the sixth portion and the seventh portion, wherein the second conductive coil is formed with a solenoid type coil configured to wind the seventh portion of the shielding member about a shaft perpendicular to the first direction or the second direction, and wherein the first conductive coil is formed with a flat type coil wound about a shaft in parallel to the first direction or the second direction.

20. The electronic device of claim 17, wherein the component comprises a camera.

* * * * *